US010086526B2

(12) United States Patent
Talken

(10) Patent No.: US 10,086,526 B2
(45) Date of Patent: Oct. 2, 2018

(54) PUFFER PAN

(71) Applicant: GEO. M. MARTIN COMPANY, Emeryville, CA (US)

(72) Inventor: Daniel J. Talken, Lafayette, CA (US)

(73) Assignee: GEO. M. MARTIN COMPANY, Emeryville, CA (US)

( * ) Notice: Subject to any disclaimer, the term of this patent is extended or adjusted under 35 U.S.C. 154(b) by 0 days.

(21) Appl. No.: 15/285,397

(22) Filed: Oct. 4, 2016

(65) Prior Publication Data

US 2018/0093387 A1 Apr. 5, 2018

(51) Int. Cl.
*B65G 51/03* (2006.01)
*B26D 7/18* (2006.01)
*B26D 1/62* (2006.01)
*B26D 7/32* (2006.01)

(52) U.S. Cl.
CPC ........... *B26D 7/1854* (2013.01); *B26D 1/626* (2013.01); *B26D 7/32* (2013.01); *B26D 2007/322* (2013.01)

(58) Field of Classification Search
CPC ......... B65G 51/03; B26D 7/27; B26D 7/1854
USPC ....................... 406/88, 89; 414/676; 493/373
See application file for complete search history.

(56) References Cited

U.S. PATENT DOCUMENTS 544,969 A * 8/1895 Dodge .................. B65G 51/03 406/88
545,013 A * 8/1895 Dodge .................. B65G 51/03 406/88
652,363 A * 6/1900 Hegland ................ B65G 51/03 406/79
994,144 A * 6/1911 Fowler .................. B65G 51/03 406/115
1,641,181 A * 9/1927 Mahon ................. B65G 53/521 406/88
1,844,635 A * 2/1932 Caller .................... B65G 53/06 406/106
1,979,138 A * 10/1934 Bingman ............... B65G 53/00 406/120
2,492,585 A * 12/1949 Kohout ..................... F23K 3/08 110/286
2,882,097 A * 4/1959 Hamren ................. B65G 53/20 406/88

(Continued)

FOREIGN PATENT DOCUMENTS

CA 1068213 12/1979
CN 2858593 1/2007

(Continued)

OTHER PUBLICATIONS

English Abstract of Chinese Patent No. CN2858593.

(Continued)

*Primary Examiner* — Joseph A Dillon, Jr.
(74) *Attorney, Agent, or Firm* — Vierra Magen Marcus LLP

(57) ABSTRACT

A puffer pan comprises a plurality of pan segments and one or more air chambers that include a plurality of groups of nozzles. Each panel segment is associated with a group of nozzles configured to blow scrap across the panel segment to at least a next location. For a subset of panel segments, the next location is an adjacent panel segment. For an end panel segment, the next location is off the puffer pan.

13 Claims, 28 Drawing Sheets

(56) References Cited

U.S. PATENT DOCUMENTS

| | | | | | |
|---|---|---|---|---|---|
| 3,131,974 | A * | 5/1964 | Futer | B65G 51/03 | 406/88 |
| 3,304,619 | A * | 2/1967 | Futer | B22C 5/08 | 34/370 |
| 3,527,460 | A | 9/1970 | Lopez | | |
| 3,698,707 | A | 10/1972 | Raymond | | |
| 3,705,676 | A * | 12/1972 | Overly | B65G 51/03 | 226/97.3 |
| 3,731,823 | A * | 5/1973 | Goth | B65G 51/03 | 198/448 |
| 3,759,579 | A * | 9/1973 | Johnston | B65G 53/18 | 406/88 |
| 3,773,391 | A * | 11/1973 | Crandall | B65G 51/03 | 406/88 |
| 3,815,762 | A | 6/1974 | Cunningham | | |
| 3,860,232 | A | 1/1975 | Martin | | |
| 3,880,420 | A | 4/1975 | Martin | | |
| 3,905,487 | A | 9/1975 | Hoke et al. | | |
| 4,079,644 | A | 3/1978 | Hoke | | |
| 4,119,220 | A | 10/1978 | Frederick | | |
| 4,133,523 | A | 1/1979 | Berthelot | | |
| 4,265,578 | A | 5/1981 | Frederick | | |
| 4,311,430 | A | 1/1982 | Frederick | | |
| 4,411,674 | A * | 10/1983 | Forgac | B01D 46/0023 | 406/172 |
| 4,433,774 | A | 2/1984 | Lopes | | |
| 4,500,243 | A | 2/1985 | Ward | | |
| 4,504,177 | A * | 3/1985 | Lagneau | B65D 88/72 | 406/136 |
| 4,508,474 | A * | 4/1985 | Frederick | B65D 88/72 | 406/137 |
| 4,655,067 | A | 4/1987 | Frost | | |
| 4,700,941 | A | 10/1987 | Shill | | |
| 4,740,193 | A | 4/1988 | Frost | | |
| 4,848,974 | A * | 7/1989 | Wayt | B65G 51/03 | 406/108 |
| 4,889,463 | A | 12/1989 | Frost | | |
| 5,026,249 | A | 6/1991 | Shill | | |
| 5,038,543 | A | 8/1991 | Neyer | | |
| 5,117,969 | A | 6/1992 | Roth | | |
| 5,205,703 | A | 4/1993 | Shill | | |
| 5,205,991 | A * | 4/1993 | Avery | B28B 11/243 | 264/211.11 |
| 5,318,166 | A * | 6/1994 | Mojden | B65G 51/03 | 198/493 |
| 5,423,657 | A | 6/1995 | Frost | | |
| 5,439,206 | A * | 8/1995 | Raasch | B26D 7/27 | 270/21.1 |
| 5,451,011 | A | 9/1995 | Frost | | |
| 5,622,330 | A | 4/1997 | Sharp | | |
| 5,682,977 | A * | 11/1997 | White | B65G 21/2063 | 198/836.1 |
| 5,980,196 | A | 11/1999 | Roth | | |
| 6,019,267 | A | 2/2000 | Shill et al. | | |
| 6,148,654 | A | 11/2000 | Jensen | | |
| 6,234,473 | B1 | 5/2001 | Morgan | | |
| 6,280,135 | B1 | 8/2001 | Cunningham | | |
| 6,361,041 | B2 * | 3/2002 | Stephan | B65H 29/52 | 271/195 |
| 6,514,015 | B1 * | 2/2003 | Trenel | B65G 51/035 | 406/83 |
| 6,519,916 | B1 * | 2/2003 | Brown | B65G 51/02 | 53/250 |
| 6,630,633 | B1 * | 10/2003 | Uber | G01G 5/006 | 177/145 |
| 6,808,358 | B1 * | 10/2004 | Mayerberg, II | B65H 5/021 | 406/193 |
| 6,843,367 | B1 * | 1/2005 | Gentile | B65G 51/03 | 198/861.1 |
| 6,986,635 | B2 | 1/2006 | Talken | | |
| 7,329,071 | B2 * | 2/2008 | Sonnichsen | B65G 53/18 | 406/144 |
| 7,404,556 | B2 | 7/2008 | Allen | | |
| 7,597,325 | B2 | 10/2009 | Maierhofer | | |
| 7,717,419 | B2 | 5/2010 | Allen | | |
| 7,753,357 | B2 | 7/2010 | Allen | | |
| 7,854,428 | B2 | 12/2010 | Allen | | |
| 7,954,628 | B2 | 6/2011 | Allen | | |
| 7,993,081 | B2 * | 8/2011 | Iida | B65G 49/065 | 406/88 |
| 8,088,255 | B2 * | 1/2012 | Alev | B65H 23/24 | 162/263 |
| 8,122,801 | B2 * | 2/2012 | Weber | B26D 7/01 | 414/676 |
| 8,807,323 | B2 | 8/2014 | Allen | | |
| 9,010,925 | B2 * | 4/2015 | Leighton | B41J 11/0085 | 347/104 |
| 9,027,737 | B2 | 5/2015 | Talken | | |
| 9,327,920 | B2 | 5/2016 | Roth | | |
| 9,365,369 | B2 | 6/2016 | Roth | | |
| 9,480,282 | B2 * | 11/2016 | Levy | A24B 3/16 | |
| 2002/0182047 | A1 * | 12/2002 | Adam | B65G 51/03 | 414/676 |
| 2006/0261120 | A1 * | 11/2006 | Slyne | B26D 5/00 | 226/95 |
| 2009/0166153 | A1 * | 7/2009 | Dotson | B65G 47/1471 | 198/393 |
| 2012/0213599 | A1 * | 8/2012 | Inazawa | B65H 23/24 | 406/88 |
| 2012/0255408 | A1 * | 10/2012 | Koch | B26D 7/00 | 83/150 |
| 2013/0087029 | A1 * | 4/2013 | Iyatani | B26D 1/245 | 83/13 |
| 2013/0101330 | A1 * | 4/2013 | Yoshida | B41J 11/66 | 400/621 |
| 2016/0122136 | A1 * | 5/2016 | Sardella | B26D 7/1854 | 406/70 |
| 2016/0130107 | A1 | 5/2016 | Allen | | |
| 2016/0145072 | A1 | 5/2016 | Allen | | |

FOREIGN PATENT DOCUMENTS

| | | |
|---|---|---|
| CN | 201530151 | 7/2010 |
| CN | 201530636 | 7/2010 |
| CN | 202279561 | 6/2012 |
| CN | 203345813 | 12/2013 |
| CN | 203877602 | 10/2014 |
| WO | WO 99/28119 | 6/1999 |
| WO | WO 99/54243 | 10/1999 |

OTHER PUBLICATIONS

English Abstract of Chinese Patent No. CN201530151.
English Abstract of Chinese Patent No. CN201530636.
English Abstract of Chinese Patent No. CN202279561.
English Abstract of Chinese Patent No. CN203345813.
English Abstract of Chinese Patent No. CN203877602.

* cited by examiner

PUFFER PAN

BACKGROUND

Manufacturers of corrugated paper products, known as Box Makers, produce both foldable boxes which have been folded and glued at the factory and die cut flat sheets which may be used either in their flat state or folded into a desired shape. These will be referred to as folded boxes and flat boxes respectively. The term boxes alone can refer to both folded and flat boxes.

Both the folded boxes and the flat boxes are produced by Converting machinery which processes the Corrugated Sheet Stock produced by the machinery known as a Corrugator. The Corrugated Sheet Stock is corrugated material cut to a specific size with optional scoring. Scoring is the intentional crushing of the corrugated flutes in order to allow folding of the corrugated material. However, the corrugated sheet stock has not been cut or notched to the detail typically required to produce the final foldable boxes or the flat boxes.

Often customized printing is required on boxes which may be done by 1) using a preprinted material integrated into the corrugated sheet stock on the Corrugator, 2) using flexographic printing during the Converting process or 3) applying ink or labels post Converting through various techniques.

During the Converting process the Corrugated Sheet Stock is transformed into a box by performing additional cutting and optionally adding scoring and printing. There are multiple possible purposes for the additional cutting of the Corrugated Sheet Stock. Many of these cutting operations will result in pieces of the original Corrugated Sheet Stock being completely separated from the final box. These pieces are in general referred to as Scrap.

As the boxes are produced there are a variety of methods to form Stacks of the boxes which in turn are sold to other companies which will be referred to as the Box Customer. There are a multitude of applications for these boxes and there are many reasons why it is undesirable for the Scrap to be included in shipment to the Box Customer. Erecting of the box is the process of taking the box and manipulating it by folding, bending, interlocking, stapling, taping, etc. in order for the box to be ready for its final usage. For Box Customers that manually erect their Boxes, the inclusion of Scrap is undesirable because of the additional mess created. For Box Customers that use automatic machinery to erect their Boxes, the Scrap can lead to jams in their machinery causing undesirable downtime and lower production. For Box Customers that use the box for food, such as a pizza box, having Scrap included in the final erected box is clearly undesirable.

The operators that work for the Box Maker are required to keep up a certain level of cleanliness which is often referred to as house cleaning. The Box Maker prefers that the amount of time required for house cleaning be held to a minimum between orders and certainly do not want to have to stop running a current in order to perform house cleaning.

One of the significant items to deal with is any scrap that gets pass outside the machinery and onto the floor of the box plant. This is particularly true if the scrap gets into an area which if difficult for the operator to get access.

The Box Maker typically has a multitude of machinery requiring compressed air and normally there is a central air compression system which feeds the entire box plant. There is both a cost in electrical energy and system maintenance associated with an increase in compressed air usage. Thus, any usage of compressed air, particularly on a continuous basis needs to be justified by the Box Maker.

In the conversion of the Corrugated Sheet Stock into Boxes the material is fed through machinery. The Lead Edge for both Corrugated Sheet Stock and Boxes refers to the first edge of travel across the machine whereas the Trailing Edge refers to the last edge of travel across the machine. The Corrugated Sheet Stock may be cut completely in the cross-machine direction in one or more locations to create two or more boxes in the through-machine direction. These are referred to as Ups. The Corrugated Sheet Stock may be cut completely in the through-machine direction in one or more locations to create two or more boxes in the cross-machine direction. These are referred to as Outs.

There are multiple methods by which the cutting of the Corrugated Sheet Stock may be accomplished during the Converting process. One example method for cutting Corrugated Sheet Stock is known as Rotary Die Cutting. A typical configuration of a Rotary Die Cutter, known as Rule and Rubber, uses of a pair of cylinders where the lower cylinder, known as the Anvil, is covered in a firm but soft rubber material and the top cylinder is mounted with a Die Board. The Die Board is normally a curved plywood base in which embedded are a customized set of steel Rules, which protrude from the plywood base and when rotated with the Anvil will cut and score the Corrugated Sheet Stock into the final desired box. The transportation speed of the box, as determined by the effective linear speed at the nip of the Die Board and Anvil, is known as Line Speed. Also relevant would be the similar process of steel-on-on steel Rotary Die Cutting. The Rotary Die Cutting process is relevant since there is not an integral method in the process for positive separation of the Scrap from the box.

In the normal production process, when changing the order to a different box, the Die Boards and Ink Plates must be changed on the Rotary Die Cutter. The Ink Plate Access is typically provided by the design of the Rotary Die Cutter. One of the common methods for allowing the operator to change the Die Boards, known as Die Board Access, is to have the stacking apparatus downstream of the Rotary Die Cutter move out of the way enough for one or more people to be able to walk into the area and swap out the Die Boards.

The Box Makers typically have many customers and a wide variety of different style of boxes which need to be produced. They need to set up and run many different orders during a given production period. The Box Maker is highly motivated to reduce the time used for setting up a new order. This is known as Order Setup Time.

An improvement in Order Setup Time can be achieved by making it more efficient to allow the operator to get access to the Sample Sheets. Sample Sheets include flat boxes that are ejected from the Converting machinery prior to being added to the stacks of finished boxes. Operators can inspect the Test Sheets to verify quality.

A Sheet Stacking Apparatus has the purpose of receiving the boxes being produced by a Rotary Die Cutter and transporting the boxes through the apparatus such that stacks of the boxes are created and exit from the discharge end of the apparatus.

The Sheet Stacking Apparatus needs to transport the boxes and does so using one or more means of conveyance. There are multiple means possible, including but not limited to conveyor belts configured above and below the boxes creating a sandwiching effect, conveyor belts below the boxes using gravity to hold down the boxes, conveyor belts below the boxes with vacuum chambers providing gravity assist, conveyor belts above the boxes with vacuum chambers using air pressure to hold up the boxes, series of wheel assemblies above and below the boxes creating a sandwiching effect, series of wheel assemblies below the boxes using gravity to hold down the boxes, and other suitable means.

The Sheet Stacking Apparatus for the Rotary Die Cutter has four functional modules.

The first functional module at the receiving end of the apparatus is typically referred to as the Layboy Function. Its function is the receiving of the boxes from the Rotary Die Cutter and assisting in the removing of the scrap from the boxes. Often speed variations are implemented in the section in preparation for the second functional module. Since the Die Drum of the Rotary Die Cutter is two cylinders and the Layboy Conveyor must have a finite thickness, designers are left with a distance between the Die Board nip and the conveying surfaces of the Layboy Function. This is the distance of no support for the boxes transitioning from the Rotary Die Cutter to the stacking apparatus and can be referred to as the RDC-Layboy Gap. It has been learned by the operators that one of the simplest ways to improve the scrap removal process is to increase the Layboy Roll Out. The Layboy Roll Out moves the conveying surfaces of the Layboy Function away from the Rotary Die Cutter thus increasing the RDC-Layboy Gap. While this increases the distance of no support for the boxes it also creates an increased opportunity for the scrap to fall away from the boxes. While on short boxes Layboy Roll Out is not practical as the lack of support leads to loss of control of the box, for longer boxes Layboy Roll Out is very effective in allowing better scrap removal without loss of box control. It is not uncommon to have Layboy Roll Out of 8 inches or greater. It is desirable for the operator to be able to increase the Layboy Roll Out during normal production operations without stopping the flow of boxes through the Sheet Stacking Apparatus. This ability is referred to as Running Layboy Roll Out.

The second functional module will be referred to as the Shingling Function. This is the widely used option in the stacking process where the boxes can be changed from Stream Mode to Shingle Mode. Stream Mode is where the boxes are being conveyed without overlap at higher speed stream. Shingle Mode happens with a transition to conveying means that are running slower than Line Speed and thus the boxes overlap and create what is known as Shingle of boxes. The speed variations referred to in the Layboy Function may to higher than Line Speed to pull gaps between the boxes to allow the creation of the Shingle of boxes.

The third functional module will be referred to as the Stacking Function. The boxes are now conveyed in either Stream Mode or Shingle Mode to where the stack of boxes is being created. The Stacking Conveyor changes elevation in order to accommodate the elevation change of the growing stack of boxes such that the conveyed boxes are deposited on the top of the stack. An alternative method is for the Stacking Conveyor to remain at a fixed elevation and the Stack Support Surface under the growing stack of boxes can move down, again such that the conveyed boxes are deposited on the top of the stack. An additional alternative is a combination of the Stacking Conveyor and the Stack Support Surface changing elevation.

The fourth functional module will be referred to as the Hopper Function. This is where the full stack of boxes or bundles of boxes are stacked and includes an Accumulation means. The accumulation means can be done by one of many well know techniques but all are common in allowing the temporary storage of boxes while the completed full stack or bundles are being conveyed out of the Hopper area. These boxes then become the base for the next full stack or bundles.

Some Stacking Apparatus require the individual boxes to be separated lateral across the machine in order to make individual stacking in the Hopper Function. This can be during the Layboy Function, the Shingling Function or the Stacking Function. If and where it is done has no relevance to the technology described herein.

The quality of the box surface and print quality is an important factor to the Box Maker. Allowing the operator to easily get a Sample Sheet is desirable. During set up of the Rotary Die Cutter there are multiple adjustments to the Rotary Die Cutter that need to checked which is ultimately checked with a visual inspection of one or more Sample Sheets after the Die Boards and Ink Plates for the new order have been changed. Often the penetration of the Die Board in intentionally reduced and a full Corrugate Sheet is fed so the Ink Plates print on the board but the die cut pattern showing the shape of the box is only imprinted. The results are the Ups and Outs are all still attached and the one large sheet can be inspected to confirm and adjust the registration of the various Ink Plates and Die Board. The operator may then fully engage the Die Board for full penetration, resulting in fully separated multiple Ups and Outs (Boxes) to be tested and inspected. The ability to provide the operator a Sample Sheet means the full imprinted Corrugated Sheet or Boxes are delivered to the operator for easy access. It does not include simply going to the discharge end in the Hopper Function or reaching into the Shingle Function or Stacking Function areas as modern machinery is required to be well guarded in these areas.

Historically, one method of providing Die Board Access was to put the entire Sheet Stacking Apparatus on wheels and roll the machinery away from the Rotary Die Cutter during order change. This also provided the operator with a means for adjusting the Layboy Roll Out. With the advent of Bundle Breaker lines, which often adds right angle take off system to the Hopper Function of the stacking apparatus having the Sheet Stacking Apparatus and its Hopper Function roll into this downstream space is less than desirable. Additionally, safety standards are now requiring hand rails on some of these downstream conveyors which are being classified as platforms. These hand rails and moving the Hopper Function can interfere or create additional hazards. Finally, while this does provide a means for the operator to adjust the Layboy Roll Out, since the Layboy Function and Hopper Function move as a unit, the operator must stop the production of boxes, make the adjustment and then re-start the production. If a partial stack has already been created, the operator must additionally adjust the partial stack by moving it under the new position of the Hopper Function and re-engage into the stack. Finally, having the entire Sheet Stacking Apparatus on wheels does not provide any means to provide the operator with Sample Sheets.

Prior Sheet Stacking Apparatus with fixed position Hopper Functions do not provide all the features of Die Board Access, Running Layboy Roll Out and Sample Sheets.

BRIEF DESCRIPTION OF THE DRAWINGS

FIG. 16A is fully compressed and FIG. 16B is fully extended.

DETAILED DESCRIPTION

Figure 1:
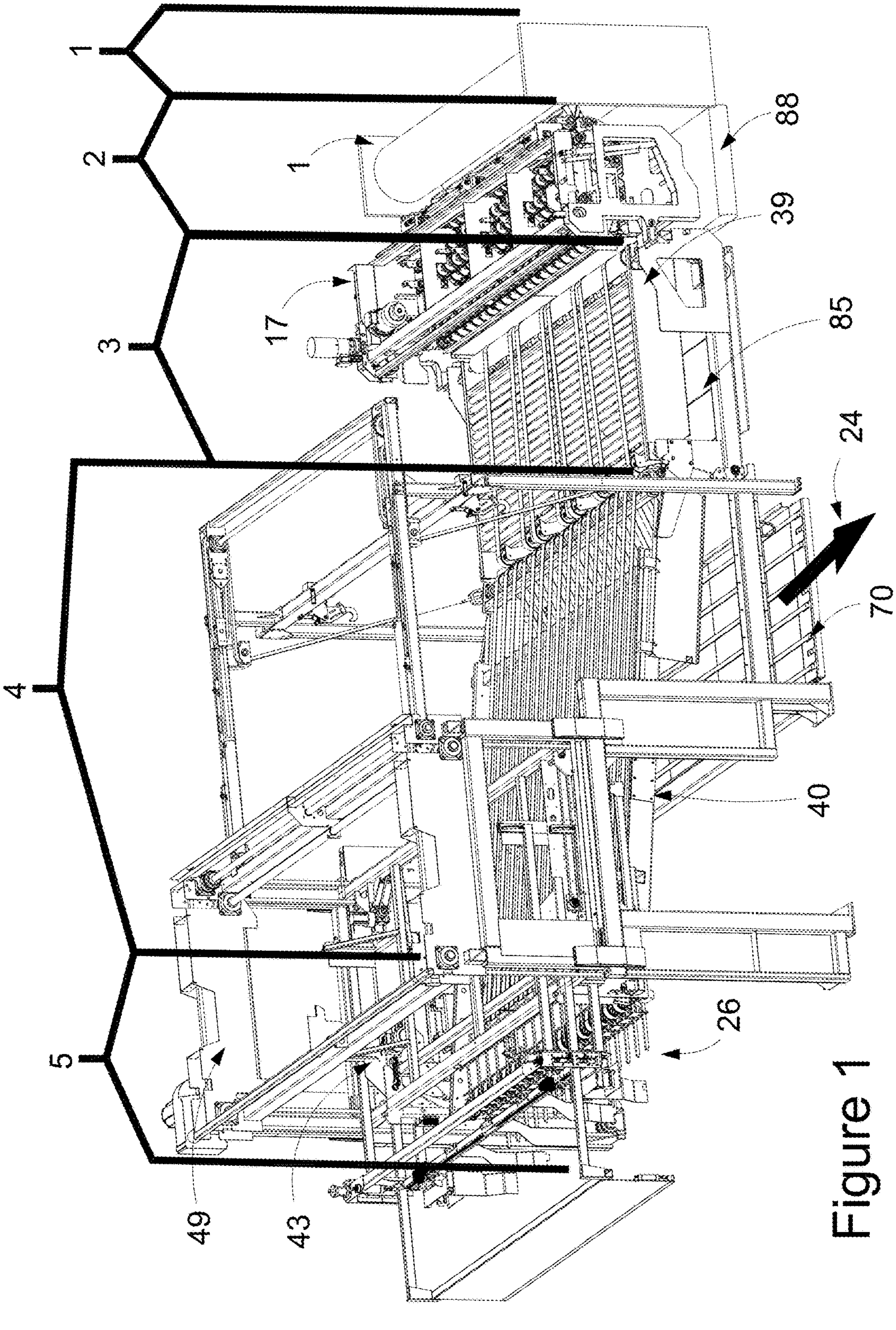
FIG. 1 depicts an improved Sheet Stacking Apparatus, perspective view of complete assembly.

A Sheet Stacking Apparatus is proposed that performs the purpose of receiving the boxes being produced by a Rotary Die Cutter 1 and transporting the boxes 9 through the apparatus such that stacks of the boxes are created and exit from the discharge end of the apparatus. One embodiment includes functional modules: Layboy Function 2, Shingling Function 3, Stacking Function 4 and Hopper Function 5. The Sheet Stacking Apparatus includes any one or more of a fixed position Hopper Function 5, Die Board Access, Running Layboy Roll Out and Sample Sheets The improved Stacking Apparatus described herein is shown in FIG. 1 fully assembled and in FIG. 2 in an exploded view for better clarity. The Layboy Function 2 can be performed by any style Layboy including U.S. Pat. No. 7,954,628, Sandwich Belt Style 10, U.S. Pat. No. 5,026,249, Lower Belt Style 14 or U.S. Pat. No. 9,027,737, or in this case Wheel Style Layboy 17. The Shingling Function 3 can be performed by a Straight Though Belt Style Transfer Deck, on the Stacking Deck 40 or in this case by a Diverting Belt Style Transfer Deck 39. The Stacking Function 4 is being performed by Telescoping Stacking Deck 40. The Gantry 49 provides the ability to vertically raise and lower both the Stacking Deck Input End 50 and the Stacking Deck Output End 41. The Hopper Function 5 can be performed by any style Accumulator such as U.S. Pat. No. 6,234,473 or other Rack Accumulators 26 well known in the industry. A Sample Sheet Conveyor 70 (belts, wheels, etc.) is shown positioned downstream of the Diverting Belt Style Transfer Deck 39 such that the gap created by the raised Stacking Deck 40 will allow a Sample Sheet to follow the Sample Sheet Board Path 24 by being fed through the Die Cutter 1, then Wheel Style Layboy 17, then Diverting Belt Style Transfer Deck 39 and fall onto the Sample Sheet Conveyor 70 which allows Sample Sheets 7 to be transported at a right angle to the flow of the production material. A Puffer Pan 85 is positioned under Diverting Belt Style Transfer Deck 39 which has gaps to allow any Scrap 96 that gets past the Wheel Style Layboy 17 to fall down onto the top surfaces of the Puffer Pan 85. The Puffer Pan Upstream End 86 is position in close proximity to the Cross Machine Scrap Conveyor 88.

Figure 3:
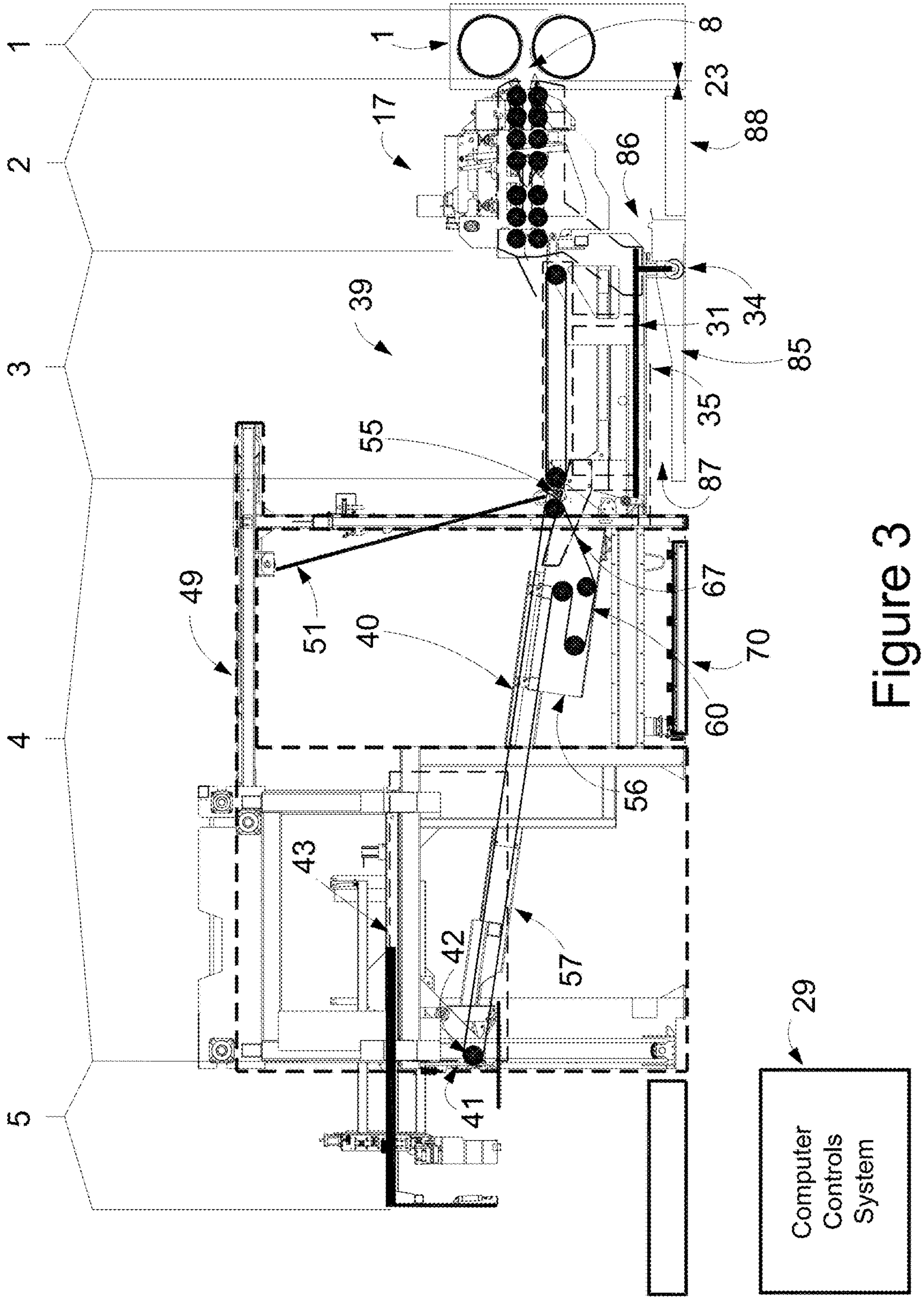
FIG. 3 depicts an improved Sheet Stacking Apparatus, side view of complete assembly with kinematic overlay

FIG. 3 is a side view with a kinematic overlay. A kinematic overlay is a simplified representation of the physical apparatuses. The solid line represent conveying surfaces, wheels, rollers and other key elements that effect board control. The dashed lines represent frames and other elements related to machine control. FIG. 4 is the kinematic overlay without all the machinery details for clarity.

The geometry of the Rotary Die Cutter 1 cylinders and the entry of the Wheel Style Layboy 17 require a finite RDC-Layboy Gap 8. In the die cutting process, if the rules and rubbering are properly done, the boxes will be discharged at Line Speed and close to horizontal in order to fly without support past the RDC-Layboy Gap 8 which has no support for the boxes. The Running Rollout Dimension 23 is defined as zero when the Layboy is as close as possible to the Rotary Die Cutter 1. Thus the distance the box has to fly without support is the RDC-Layboy Gap 8 plus the Running Rollout Dimension 23.

The Layboy-Transfer Deck Frame 31 is supported by Floor Tracks 34 and Gantry Tracks 35 and selectively positioned horizontally by Computer Control System 29. This allows the horizontal positioning of Wheel Style Layboy 17 and Diverting Belt Style Transfer Deck 39 which changes the Running Rollout Dimension 23. The operator can make this adjustment while running production and is advised to make as large as possible to allow the maximum amount of Scrap 96 to fall away from the boxes while still being close enough to not lose control of the boxes as they fly from the Rotary Die Cutter 1 to the Wheel Style Layboy 17.

The goal is for a fixed Hopper Function 5 and thus the Stacking Deck Output End 41 should not move horizontally as the Wheel Style Layboy 17 and Diverting Belt Style Transfer Deck 39 move horizontally. In order to accommodate the horizontal movement, the Telescoping Stacking Deck 40 can change length. It has a Stacking Deck Output End 41 which is connected via Stacking Deck Downstream Frame 57 with Stacking Deck Discharge Pivot Connection 42 to Lift Frame 43. This allows the Computer Control System 29 to selectively move the Stacking Deck Output End 41 of the Telescoping Stacking Deck 40 vertically for stack building while still constraining it from horizontal motion. Since the Telescoping Stacking Deck 40 can change length it allows for the length change requirements associated with the horizontal positioning of Wheel Style Layboy 17 and Diverting Belt Style Transfer Deck 39. It also allows for the length change requirements associated with the geometric nature of the changes in elevation of the Stacking Deck Output End 41 while the Stacking Deck Input End 50 remains at essentially the same elevation. The Telescoping Stacking Deck 40 is essentially the hypotenuse of a geometric triangle with a changing vertical distance.

The Stacking Deck Input End 50 is operatively connected via Stacking Deck Upstream Frame 56 to Deck Entry End Chains 51 by Upstream Deck Pivot Connection 66. Deck Entry End Chains 51 are able to provide lift to the Stacking Deck Upstream Frame 56 by being operatively connected to Gantry 49. The Stacking Deck Input End 50 is operatively supported in it lower position by Transfer Deck Ramps 67 upon which Stacking Deck Ramp Wheels 55 can engage and come to rest when being lowered by Deck Entry End Chains 51. The angle of the Transfer Deck Ramps 67 allows the Stacking Deck Ramp Wheels 55 to land on the Transfer Deck Ramps 67 regardless of the current Running Layboy Roll Out 23. As a result, the Telescoping Stacking Deck 40 uses gravity the describe constraints to extend and retract without need for any additional actuators.

The Lift Frame 43 is operatively connected to the Gantry 49 to allow the Computer Control System 29 to selectively control the elevation of Stacking Deck Output End 41. While the Lift Frame 43 can be substantial in size as shown in these figures it could easily be as small as mechanically required to make a connection between Stacking Deck Discharge Pivot Connection 42 on a horizontal constraint on the Gantry 49.

The Computer Control System 29 coordinates the motion control of the machinery with the requests inputs by the operators. The operator inputs desired order settings and machine action request through a graphical user interface as well as discreet switches. The Computer Control System 29 is connected to the mechanics using well know technology, including servo motor controls, hydraulic systems, pneumatic system with sensors and actuators. Motion control, including coordinated motion control, feedback system, sensors for feedback are all know technology uses by the Computer Control System 29.

Figures 4A, 4B:
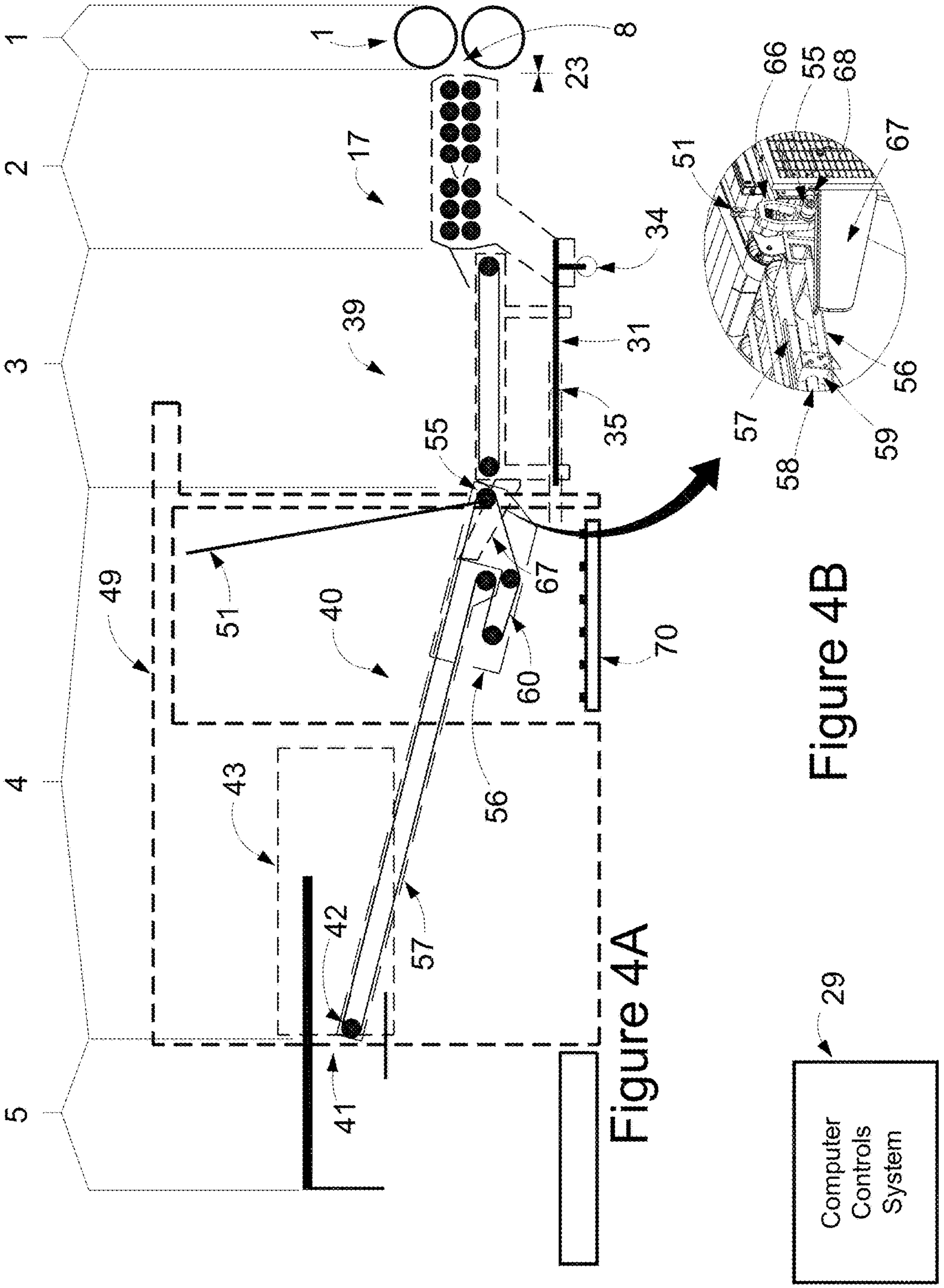
FIG. 4A depicts an improved Sheet Stacking Apparatus, side view of kinematic overlay only, in the Normal Running State, with minimum Layboy Roll Out 23 and the RDC-Layboy Gap 8.
FIG. 4B is a perspective view depicting details of how the Telescoping Stack Deck 40 interfaces with the Transfer Deck Ramps 67.
Figure 5:
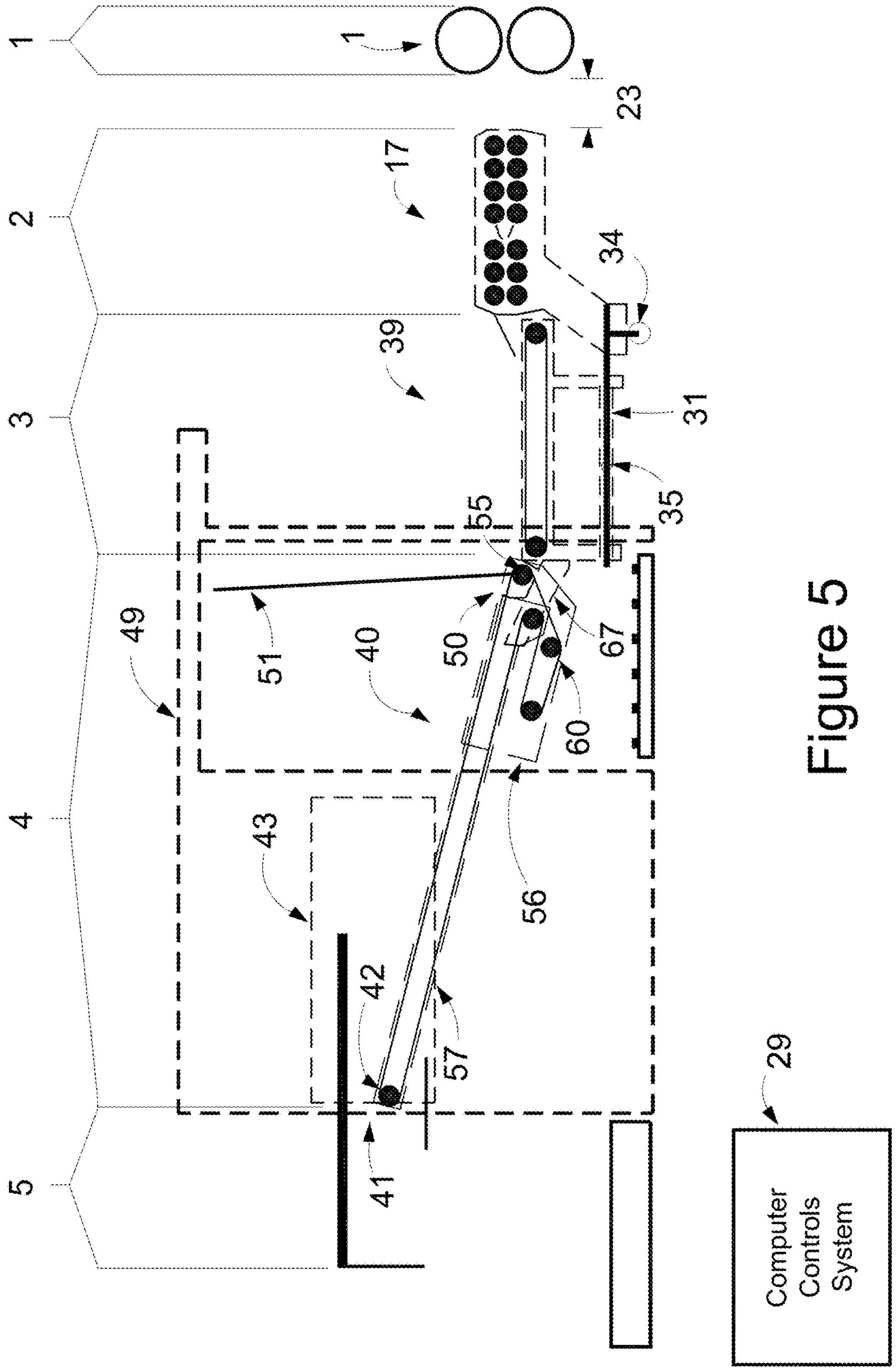
FIG. 5 depicts an improved Sheet Stacking Apparatus, side view of kinematic overlay only, in the Normal Running State, with increased Running Layboy Roll Out 23.

FIG. 4A depicts the normal running state, with minimum Running Layboy Roll Out (and minimal RDC-Layboy Gap). To get to the Normally Running State 20, the Computer Control System 29 horizontally moves Layboy-Transfer Deck Frame 31 near the Rotary Die Cutter 1 to achieve the desired Running Layboy Roll Out 23. Extend Deck Entry End Chains 51 lowering Stacking Deck Input End 50 until Stacking Deck Ramp Wheels 55 engages Transfer Deck Ramps 67 and moves to its stop position against Stacking Deck Ramp Stops 68. Move Stacking Deck Output End 41 to the proper elevation to start or resume stack building. Start all conveying surfaces and begin feeding Corrugated Sheet Stock Like FIG. 4, FIG. 5 also shows the Normal Running Position. Computer Controls System 29 has moved Wheel Style Layboy 17 and Diverting Belt Style Transfer Deck 39 horizontally, away from Rotary Die Cutter 1. To make Running Layboy Roll Out 23 adjustment once in Normally Running State 20, horizontally move Layboy-Transfer Deck Frame 31 relative to the Rotary Die Cutter 1 to achieve the desired Running Layboy Roll Out 23 without stopping normal production flow. The increase in RDC-Layboy Gap achieved in FIG. 5 is achieved by shortening Telescoping Stacking Deck 40.

Figure 6:
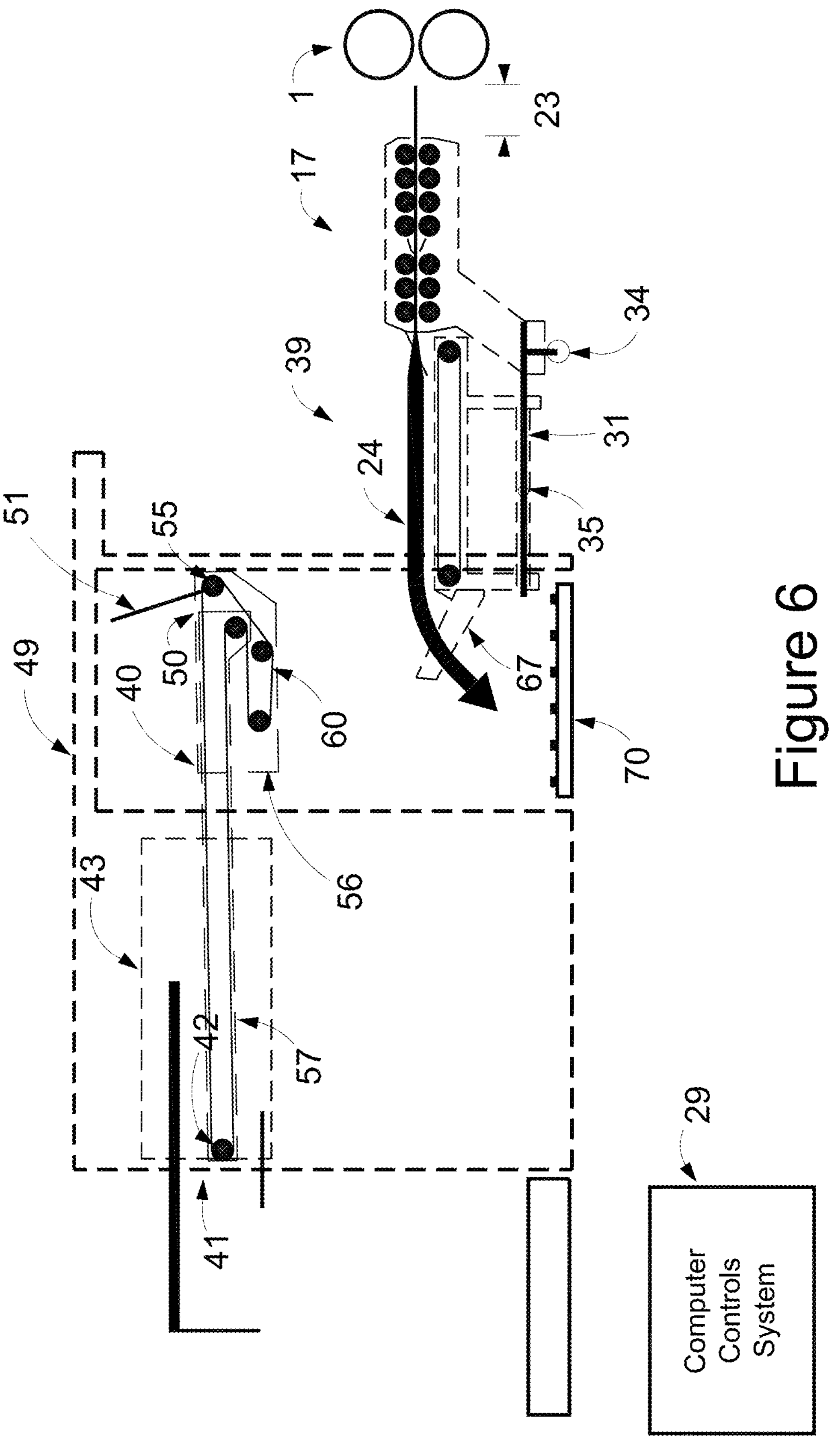
FIG. 6 depicts an improved Sheet Stacking Apparatus, side view of kinematic overlay only, in the Sample Sheet State.

FIG. 6 depicts the Sample Sheet State 22, in which a Sample Sheet is fed out to an operator. Sample Sheet Conveyor 70 (belts, wheels, etc) is shown positioned downstream of the Diverting Belt Style Transfer Deck 39 such that the gap created by the raised Stacking Deck 40 will allow a Sample Sheet to follow the Sample Sheet Board Path 24 by being fed through the Die Cutter 1. The Computer Control System 29 can track this Sample Sheet and then convey the sheet out from within the guarded area to the awaiting operator using Right Angle Sample Sheet Conveyor 70. To get to the Sample Sheet State 21, the Computer Control System 29 horizontally moves Layboy-Transfer Deck Frame 31 near the Rotary Die Cutter to achieve the desired Running Layboy Roll Out 23. Raise Lift Frame 43 and thus Stacking Deck Output End 41 as well as retract Deck Entry End Chains 51 raising Stacking Deck Input End 50 until adequate clearance under Telescoping Stacking Deck 40 for a Sample Sheet 7 to be able to fall from the end of Diverting Belt Style Transfer Deck 39 onto Sample Sheet Conveyor 70. Run the conveyor belts in Wheel Style Layboy 17 and Diverting Belt Style Transfer Deck 39 at a speed appropriate to let the Sample Sheet 7 sail and land on 70. Release one or more sheets from the Feed Table based on operator settings. After a time delay to allow the sheet to settle on Sample Sheet Conveyor Belts 82, run the belts for a period of time to adequate to conveyor the Sample Sheet 7 out the side of the machine. Note that the input end of Sample Sheet Conveyor 70 is blocked from receiving a Sample Sheet when Stacking Deck 40 is lowered, as depicted in FIGS. 4 and 5.

Figure 7:
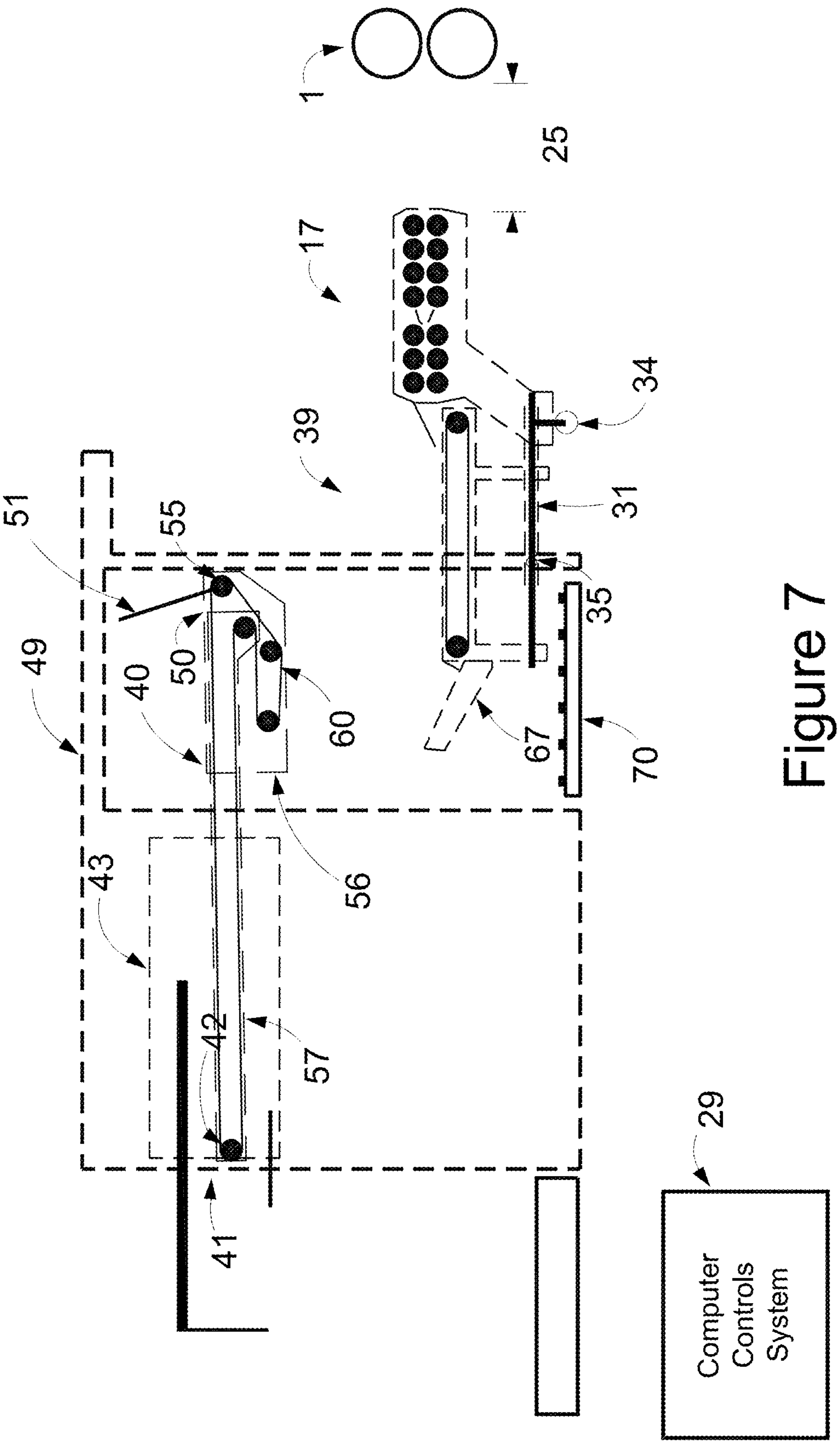
FIG. 7 depicts an improved Sheet Stacking Apparatus, side view of kinematic overlay only, in the Die Board Access State.
Figure 8A:
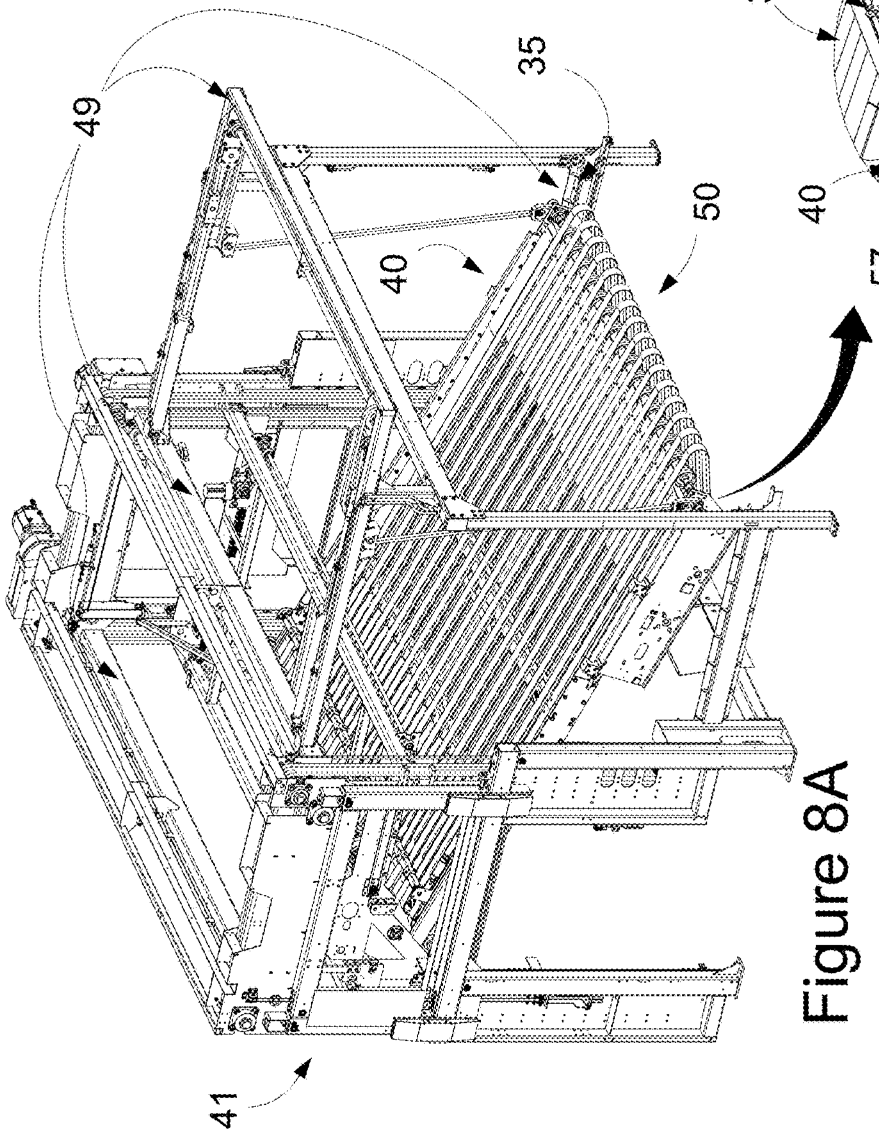
FIG. 8A depicts a perspective view of a Telescoping Stacking Deck 40 and the mechanisms to raise and lower both ends.
Figure 8B:
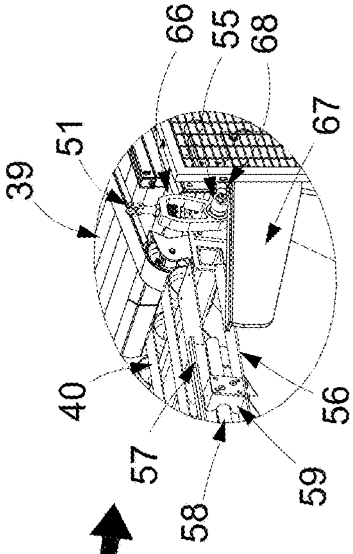
FIG. 8B provides a close-up of a portion of FIG. 8A.
Figure 9:
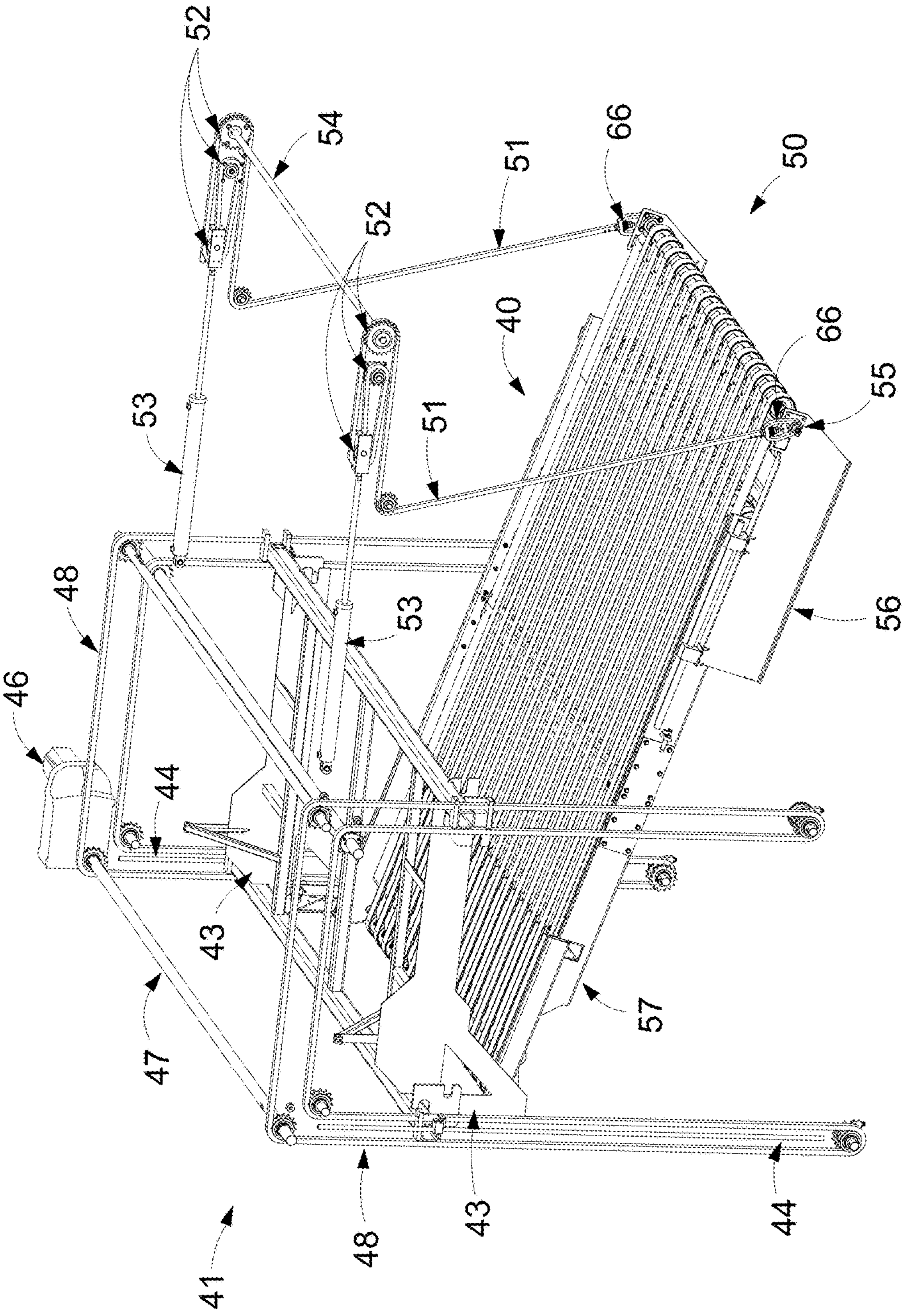
FIG. 9 depicts a perspective view with only the key kinematic components shown for clarity of a Telescoping Stacking Deck 40 and the mechanisms to raise and lower both ends from the entry end view.
Figure 10:
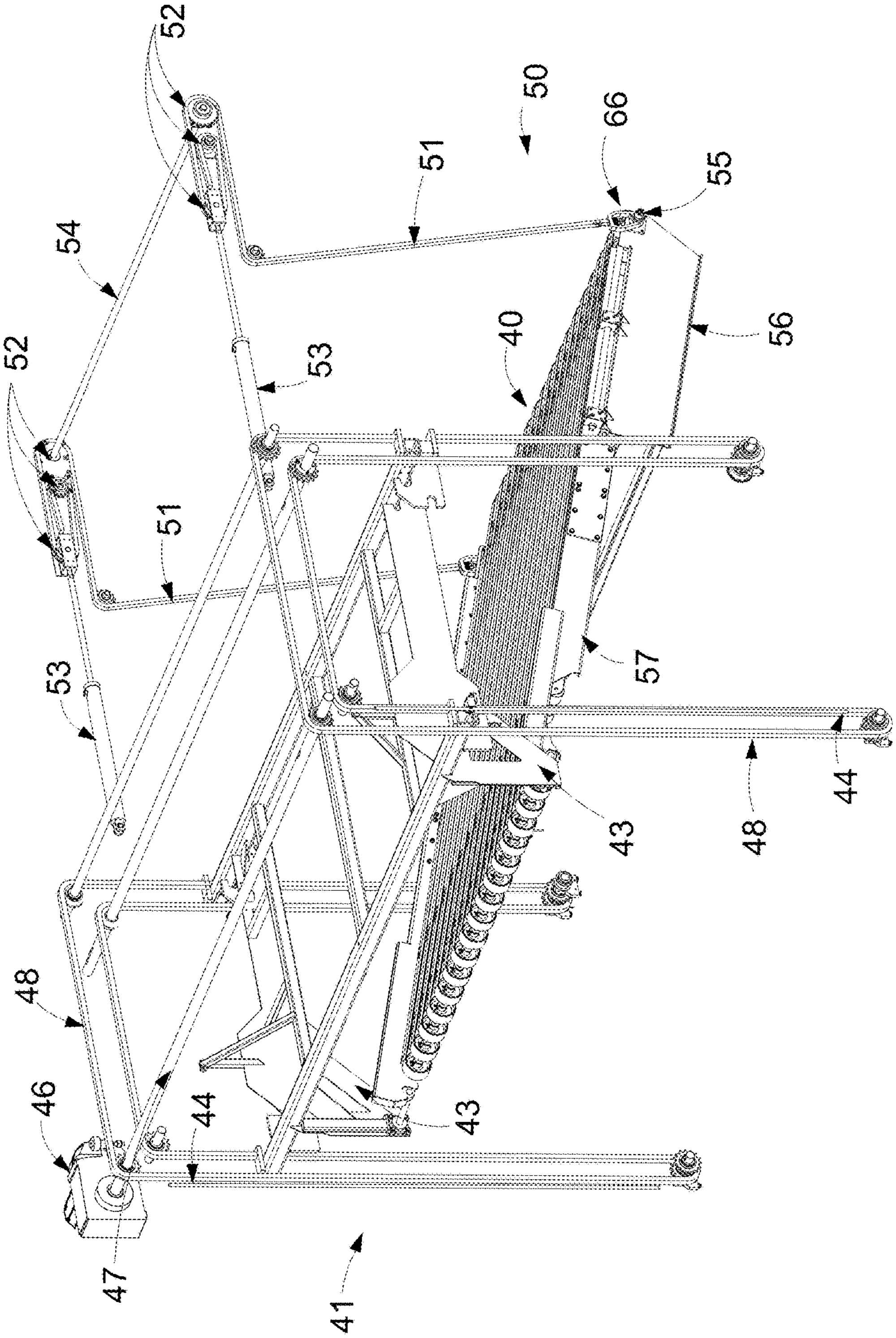
FIG. 10 depicts a perspective view with only the key kinematic components shown for clarity of a Telescoping Stacking Deck and the mechanisms to raise and lower both ends from the discharge end view.

FIG. 7 depicts the Die Board Access State, in which the Layboy 17 is moved away from the Rotary Die Cutter 1, without moving the hopper 5, thereby providing an operator with access to Rotary Die Cutter 1. To get to the Die Board Access State the Computer Control System 29 raises Lift Frame 43 and thus Stacking Deck Output End 41 as well as retract Deck Entry End Chains 51 raising Stacking Deck Input End 50 until adequate clearance for the and Diverting Belt Style Transfer Deck 39 to be able to move under the Telescoping Stacking Deck 40. Layboy-Transfer Deck Frame 31 is moved horizontally away from the Rotary Die Cutter to achieve the desired Die Board Access Dimension 25. In the Die Board Access State depicted in FIG. 7, the Telescoping Stacking Deck 40 is shorter in length than in the Normal Running Position of FIG. 4 and the Diverting Belt Style Transfer Deck 39 has rolled to a position over the Sample Sheet Conveyor 70.

In FIGS. 8A, 8B, 9, and 10, details one means of mechanics for a Gantry 49, a Lift Frame 43, and a Stacking Deck 40. These mechanics provide the constraints and allow the Computer Control System 29 to control both ends of the Telescoping Stacking Deck 40. The Stacking Deck Output End 41 is constrained by rails 44 to vertical motion only as it is operatively connected to lift frame 43. Stacking Deck Input End 50 is either resting in where Stacking Deck Ramp Wheels 55 is resting against Stacking Deck Ramp Stops 68 or is lifted to some higher elevation by Deck Entry End Chains 51 which is actuated by Deck Entry Cylinder 53. These mechanics perform the Stacking Function 4.

The Gantry is fixed to the ground. A Lift Frame 43 is guided by rails 44 as a vertical motion constraint. Lift Frame Motor 46 actuates Lift Shaft 47, both which are mounted to Gantry 49. The Lift Shaft 47 is operatively connected to Lift Frame 43 by Lift Frame Chains 48. A Stacking Deck 40 has a Stacking Deck Output End 41 and a Stacking Deck Input End 50. The Stacking Deck Output End 41 is connected via Stacking Deck Downstream Frame 57 with Stacking Deck Discharge Pivot Connection 42 to Lift Frame 43. The Stacking Deck Input End 50 is connected via Stacking Deck Upstream Frame 56 to Deck Entry End Chains 51 by a Upstream Deck Pivot Connection 66.

Deck Entry Chains 51 are operatively connected through sprockets 52 to Deck Entry Cylinder 53 which is mounted on Gantry 49. Synchronizing shaft 54 allow the two Deck Entry Cylinders 53 to act in unison.

Figure 11:
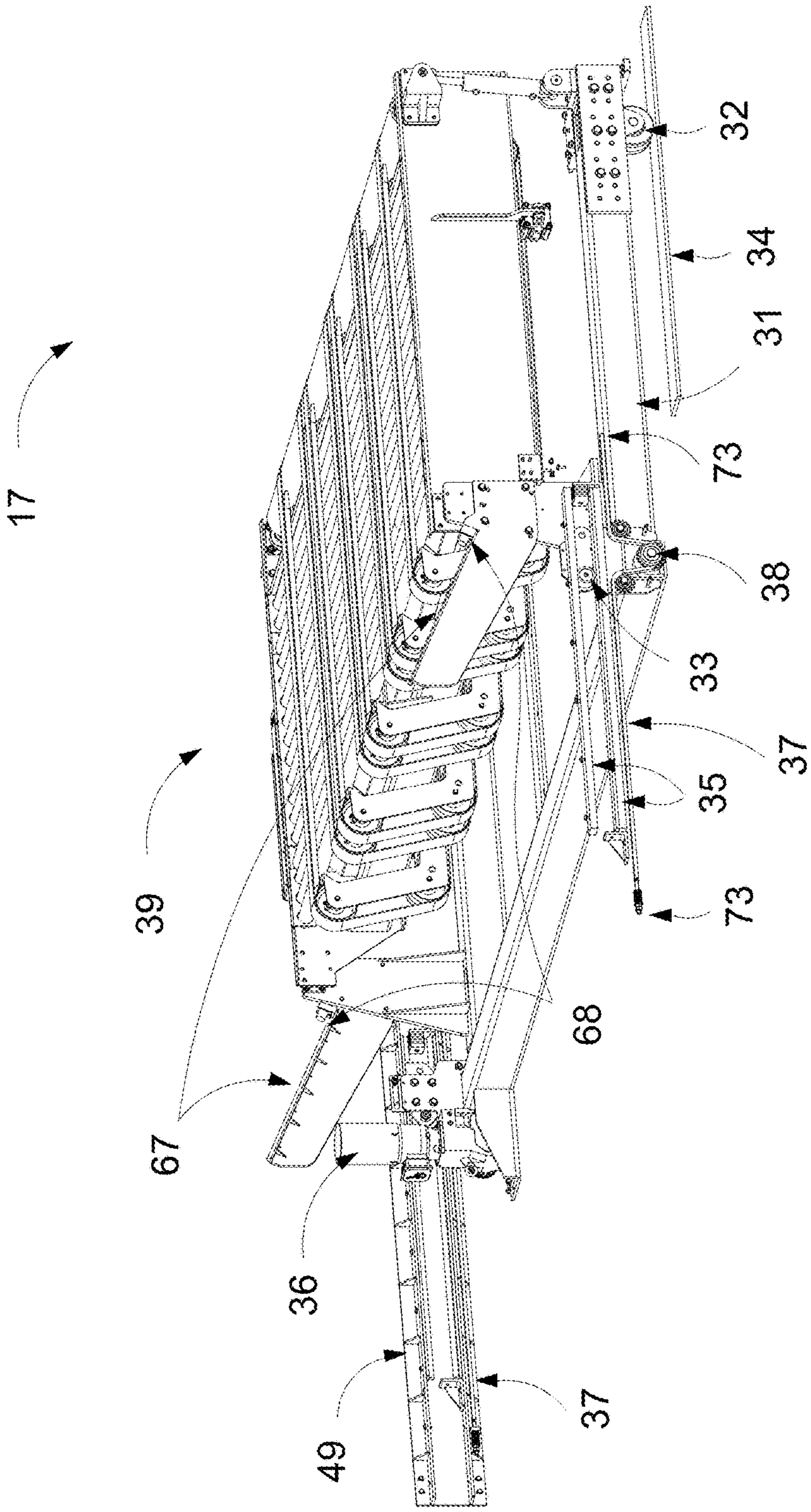
FIG. 11 depicts a perspective view of a Diverting Belt Style Transfer Deck 39 and the Wheel Style Layboy 17 with the mechanism to allow horizontal movement.
Figure 12:
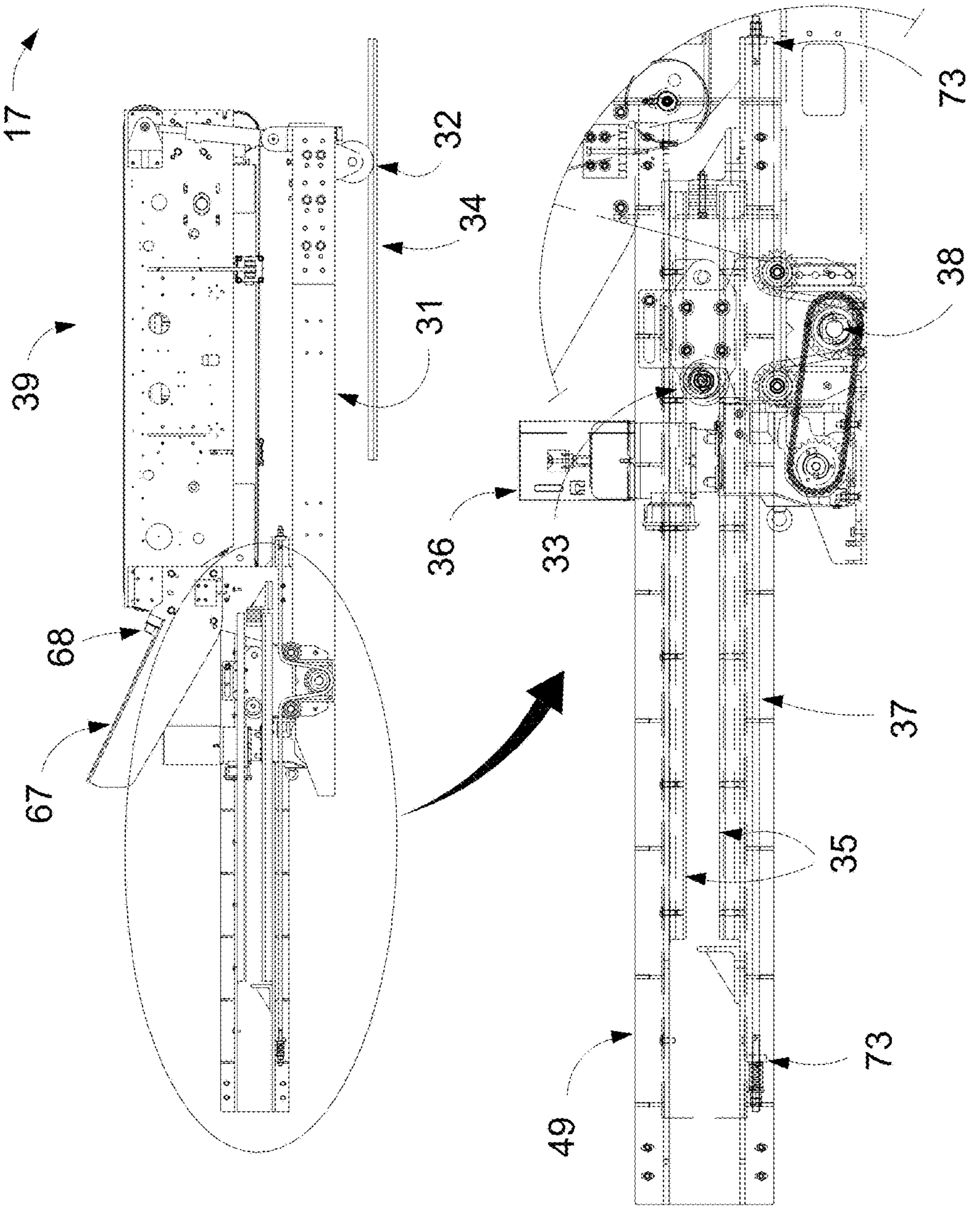
FIG. 12 depicts a side view of a Diverting Belt Style Transfer Deck 39 and the Wheel Style Layboy 17 with the mechanism with details to allow horizontal movement.

In FIGS. 11 & 12, a Wheel Style Layboy 17 performing the Layboy Function 2 is connected to a Layboy-Transfer Deck Frame 31 which is able to move in a generally horizontal motion. Wheels 32 & 33 ride on tracks 34 & 35 to allow the motion. Tracks are directly or indirectly connected to ground. A Diverting Belt Style Transfer Deck 39 is attached to the same Layboy-Transfer Deck Frame 31 and positioned downstream of the Wheel Style Layboy 17 in order to perform the Shingling Function 3. A Roll Out Motor 36 driving synchronized Roll Out Chains 37 which are anchored to the downstream Gantry 49 at Roll Out Chain End Points 73 via Roll Out Synchronizing Shaft 38 allows the Computer Controls System 29 to move the Layboy- Transfer Deck Frame 31 and thus Wheel Style Layboy 17 and Diverting Belt Style Transfer Deck 39.

Figures 13A, 13B:
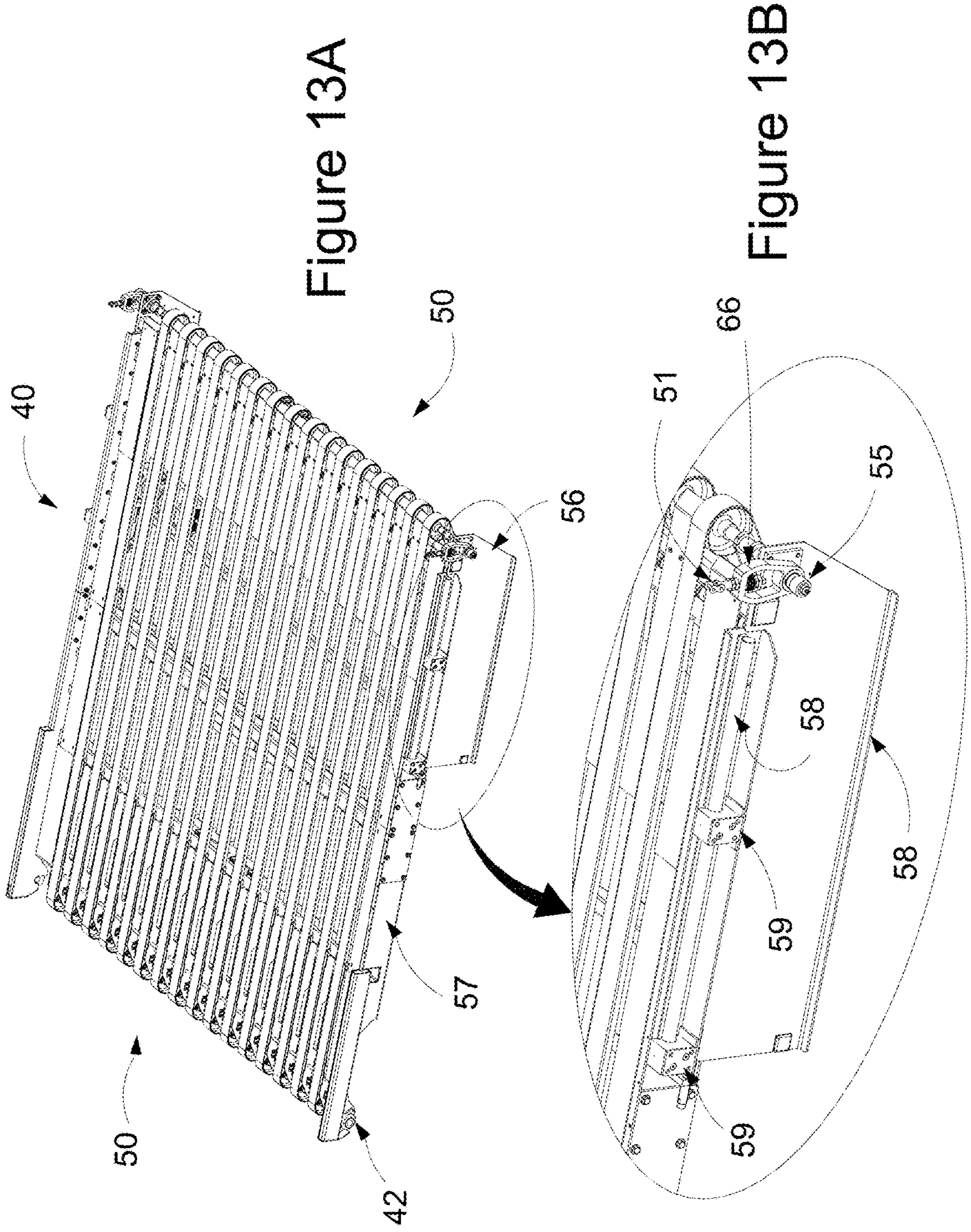
FIG. 13A depicts a Telescoping Stacking Deck 40, Upper Entry Perspective View.
FIG. 13B is a zoomed view of FIG. 13A.
Figure 14:
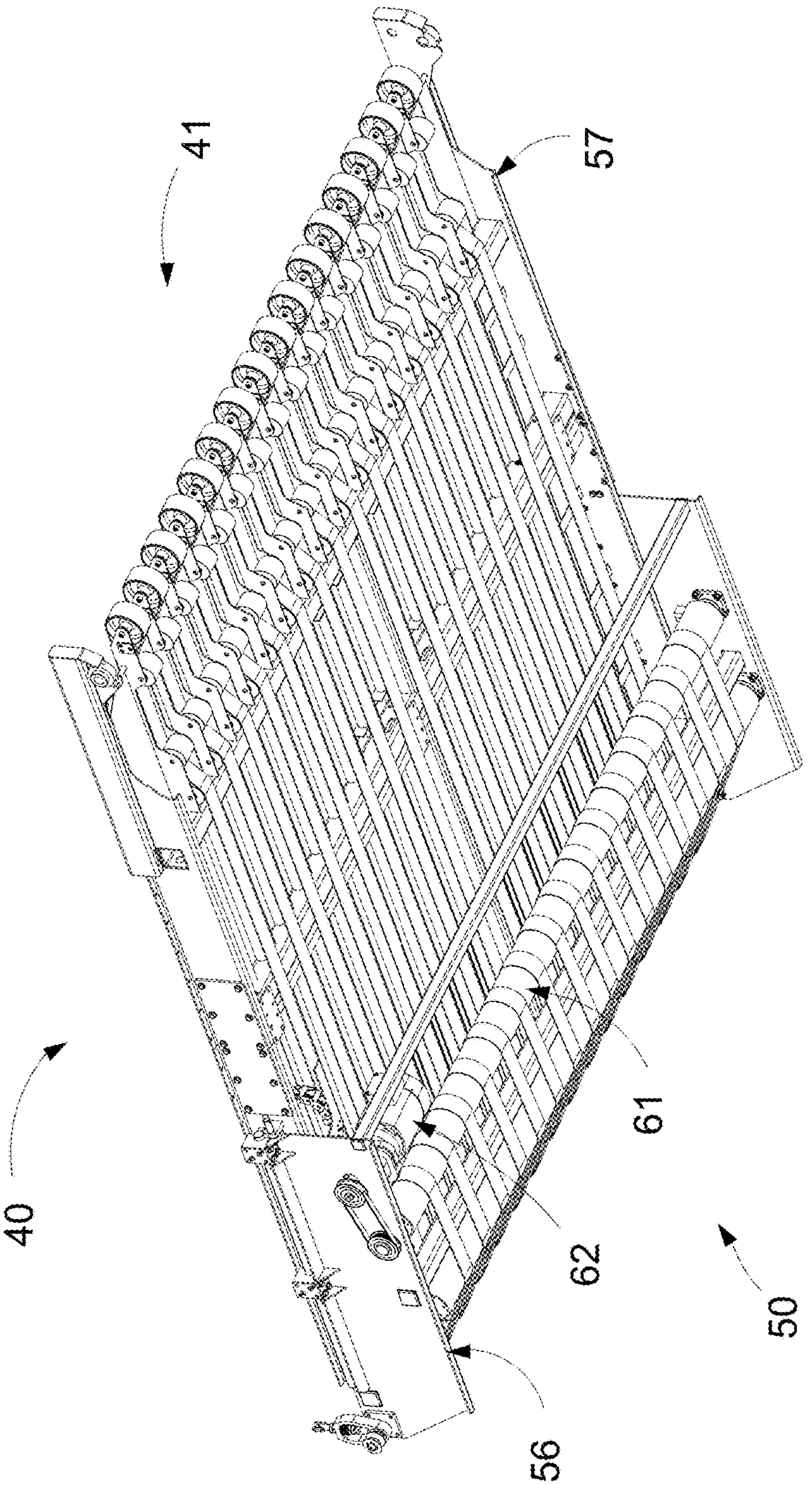
FIG. 14 depicts a Telescoping Stacking Deck, Lower Exit Perspective View

In FIGS. 13 and 14 Stacking Deck 40 has Stacking Deck Upstream Frame 56 with protruding Stacking Deck Ramp Wheels 55 mounted such that they will intersect Transfer Deck Ramps 67 positioned to receive the Stacking Deck 40 as it is lowered even at the shortest telescoping length. The effect of gravity on the Stacking Deck Upstream Frame 56 will extend the Stacking Deck 40 to where the Stacking Deck Ramp Wheels 55 rest on the Stacking Deck Ramp Stops 68. This is the Normal Running Position 20 in which production of boxes can take place.

Figures 15A, 15B:
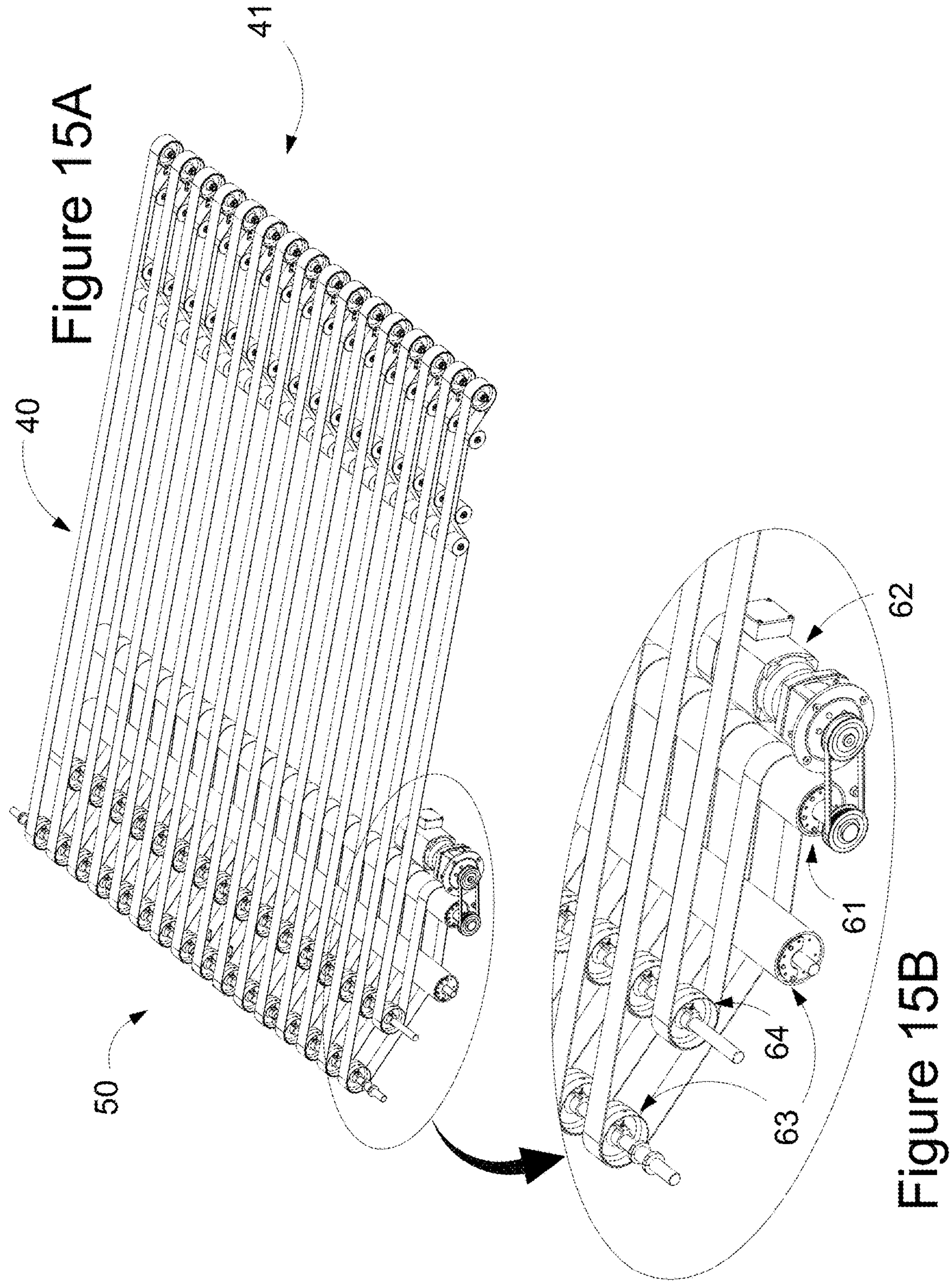
FIG. 15A depicts a Telescoping Stacking Deck, Belts, Rollers and Pulley, Perspective View.
FIG. 15B is a zoomed view of FIG. 15A.
Figure 16A:
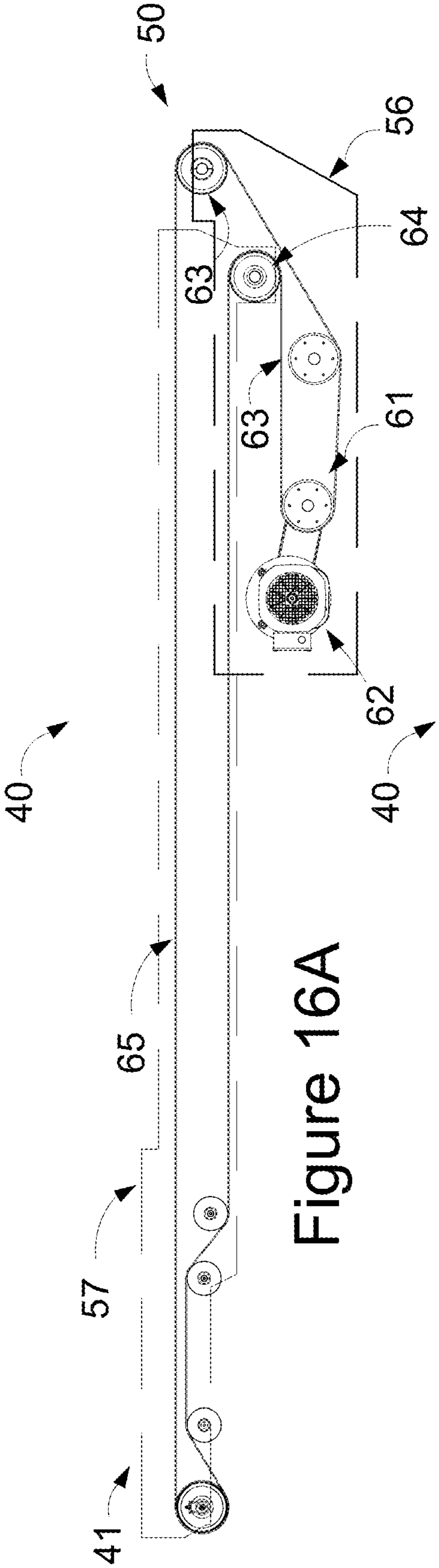
FIGS. 16A and B depicts a Telescoping Stacking Deck, Belts, Rollers and Pulleys, Side Views.
Figure 16B:
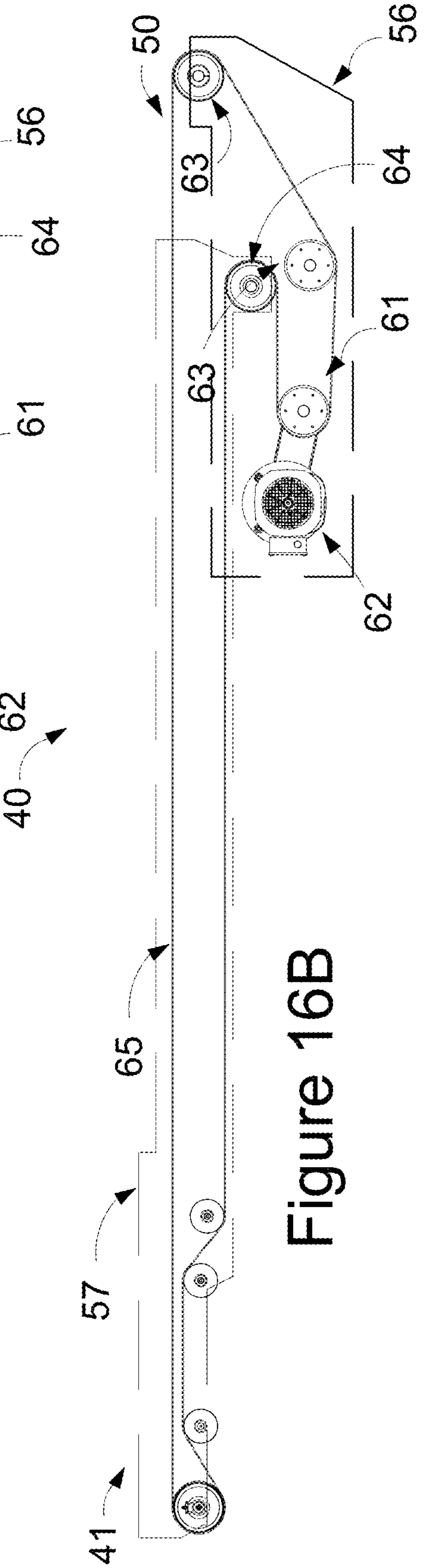

Stacking Deck 40 is of a telescoping design such that the length of the deck can vary in order to provide adequate Running Layboy Roll Out variation. The Stacking Deck Upstream Frame 56 is connected to the Stacking Deck Downstream Frame 57 with Stacking Deck Linear Rails 58 mounted to Stacking Deck Downstream Frame 57 and Stacking Deck Pillow Blocks 59 mounted to Stacking Deck Upstream Frame 56. FIGS. 15A and 15B show the Stacking Deck Belt Path 60 in perspective view, which is powered by roller 61 operative connected to Stacking Deck Belt Motor 62. FIGS. 16A and 16B show the Stacking Deck Belts 65 in the two extreme cases of telescoping length. Stacking Deck powered roller 61 and Upstream Rollers 63 move with Stacking Deck Upstream Frame 56 and Stacking Deck Downstream Rollers 64 move with Stacking Deck Downstream Frame 57. Stacking Deck Belts 65 follow a path that does not substantially change lengths as the Stacking Deck Upstream Frame 56 and Stacking Deck Downstream Frame 57 telescope. As Stacking Deck Belts 65 are designed to move boxes, Stacking Deck 40 operates as a stacking conveyor.

Figures 17A, 17B, 17C:
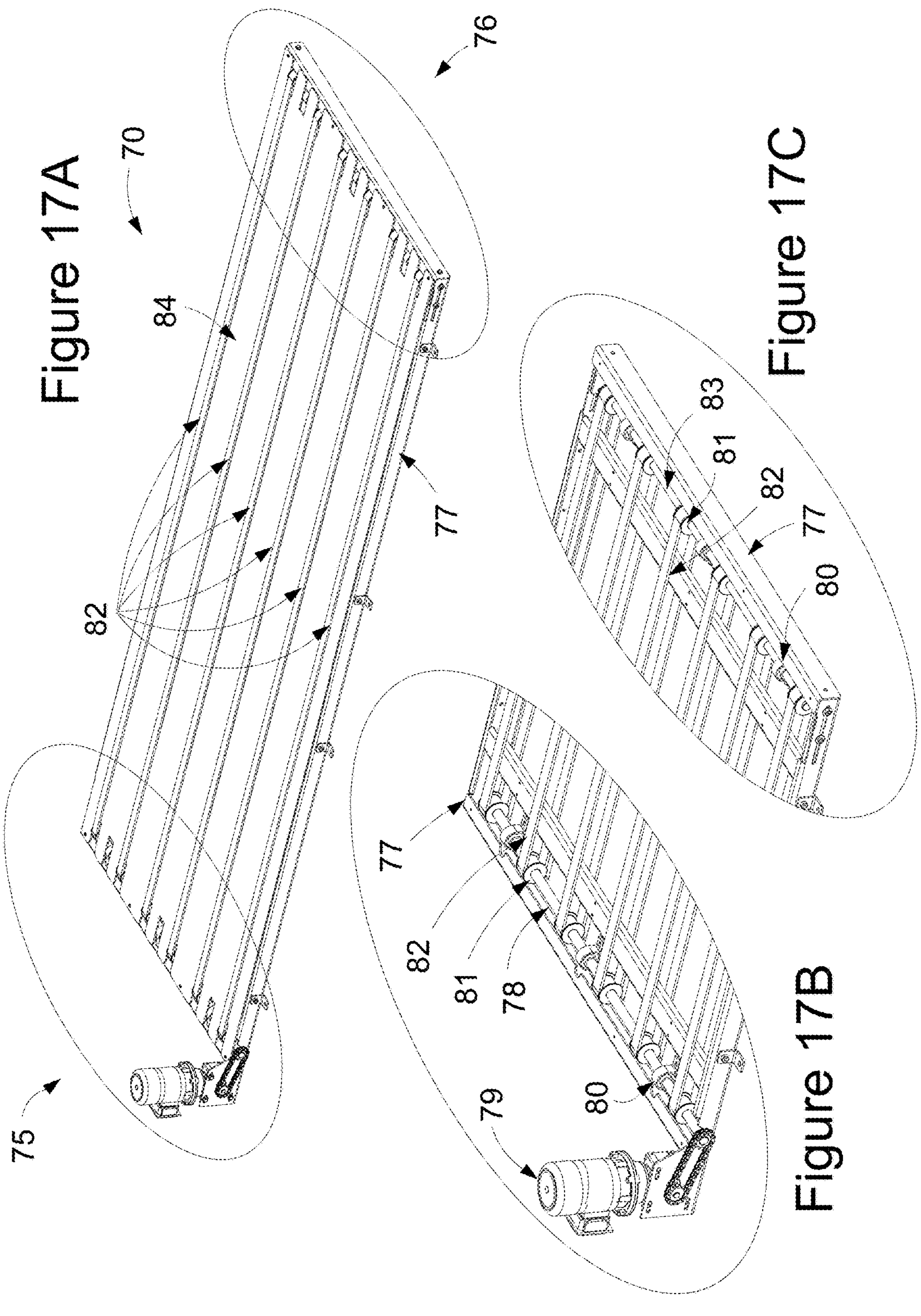
FIG. 17A depicts a Sample Sheet Conveyor 70 perspective view in complete form.
FIG. 17B is a detail perspective view of the drive end of the Sample Sheet Conveyor 70 with covers removed for clarity.
FIG. 17C is a detail perspective view of the idler end of the Sample Sheet Conveyor 70 with the covers removed for clarity.

In FIG. 17A, a Right Angle Sample Sheet Conveyor 70 has a Drive Side 75 and an Operator Side 76. The Right Angle Sample Sheet Conveyor 70 has a frame 77 with a motor and gear box 79 operatively connected to drive shaft 78 shown in FIG. 17B. Drive shaft 78 is mounted to the frame 77 with bearings 80. Also fixed to the drive shaft 78 is a plurality of flat belt pulleys 81. These pulleys provide the propelling force to the Sample Sheet Conveyor Belts 82. The Right Angle Sample Sheet Conveyor 70 has a frame 77 with a idler shaft 83 shown in FIG. 17C. Idler shaft 78 is mounted to the frame 77 with bearings 80. Also fixed to the idler shaft 83 is a plurality of flat belt pulleys 81. These pulleys provide the return path for to the Sample Sheet Conveyor Belts 82. Sample Sheet Conveyor Belts 82 protrude above frame 77 cover plates 84

Figure 18:
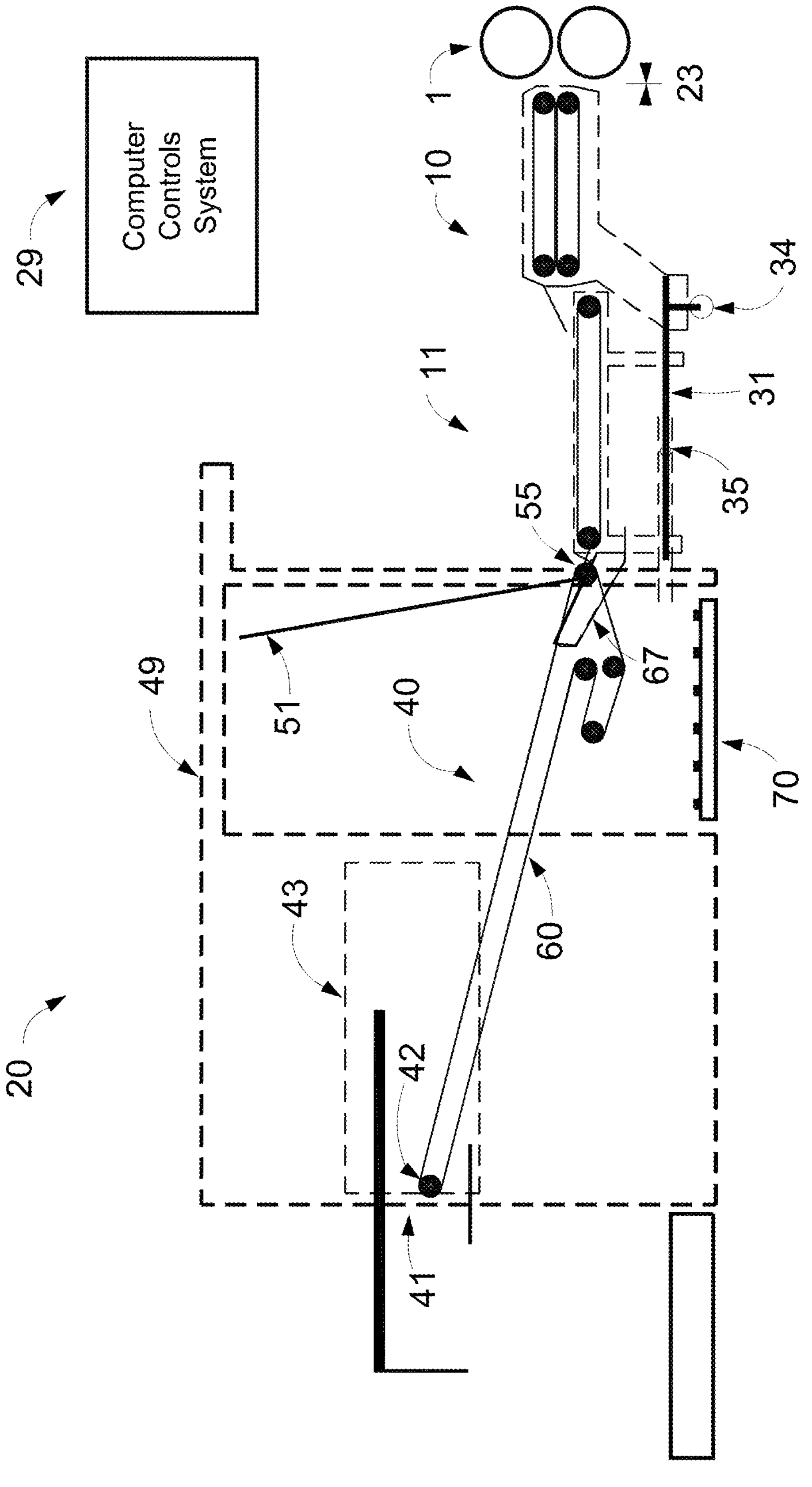
FIG. 18 depicts an alternate improved Stacking Apparatus, side view of kinematic overlay only, Normal Running State 20, Minimum Layboy Roll Out 23.
Figures 19A, 19B, 19C:
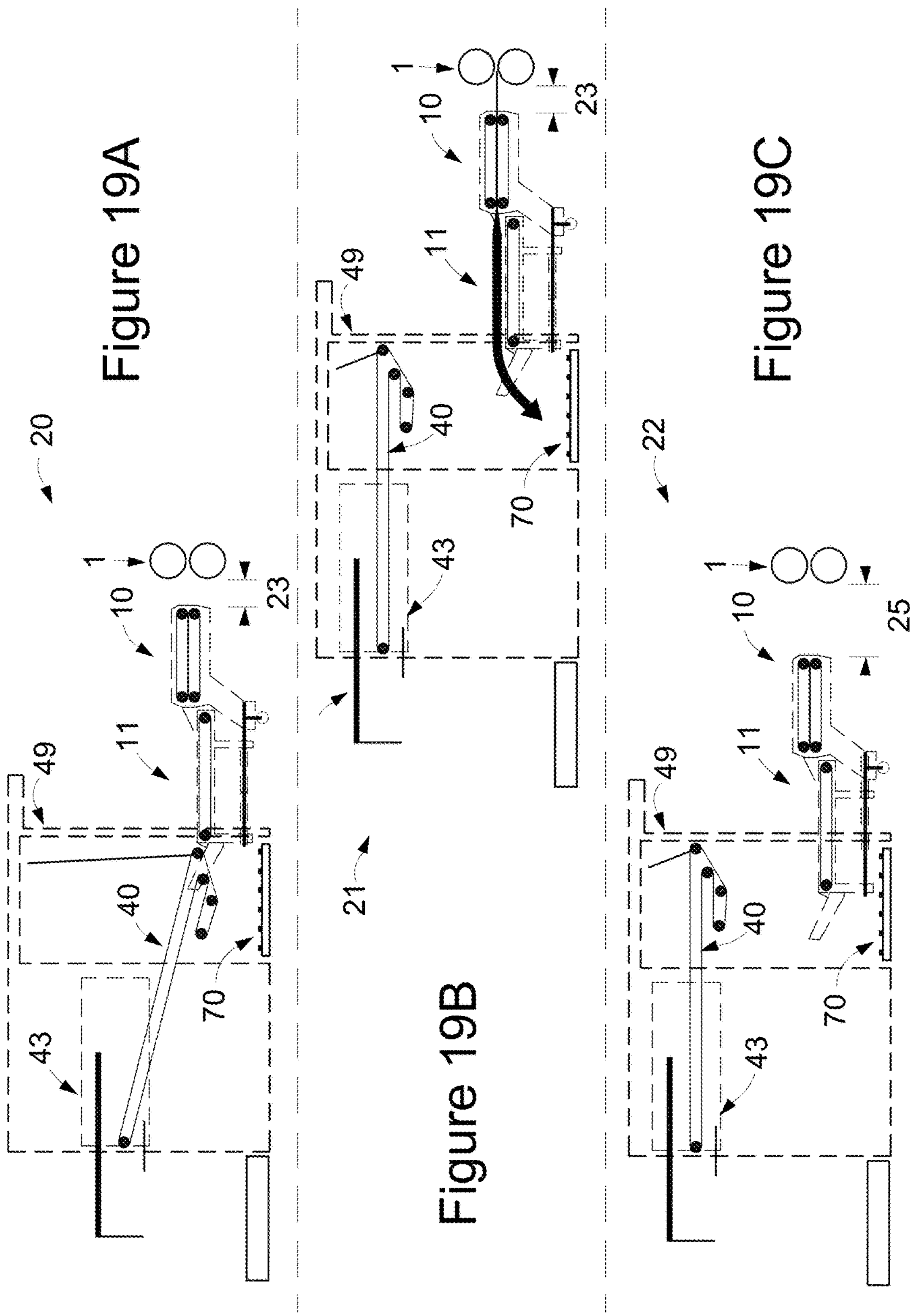
FIG. 19A-19C depicts an alternate improved Stacking Apparatus of FIG. 18, side view of kinematic overlay only, Normal Running State 20 with increased Running Layboy Roll Out 23 (FIG. 19A), Sample Sheet State 21 (FIG. 19B) and Die Board Access State 22 (FIG. 19C).

In FIGS. 18 and 19, an alternate embodiment of the improved Stacking Apparatus is shown in kinematic overlay form. In this configuration, one variation is the use of equivalent mechanics for performing the Layboy Function where the Wheel Style Layboy 17 is replaced with a Sandwich Belt Style Layboy 10 to perform the Layboy Function 2 and where the Diverting Belt Style Transfer Deck 39 is replaced with a Straight Belt Style Transfer Deck 11 to perform the Shingling Function 3. The same three states Normal Running State 20, Sample Sheet State 21 and Die Board Access State 22 are possible.

Figure 20:
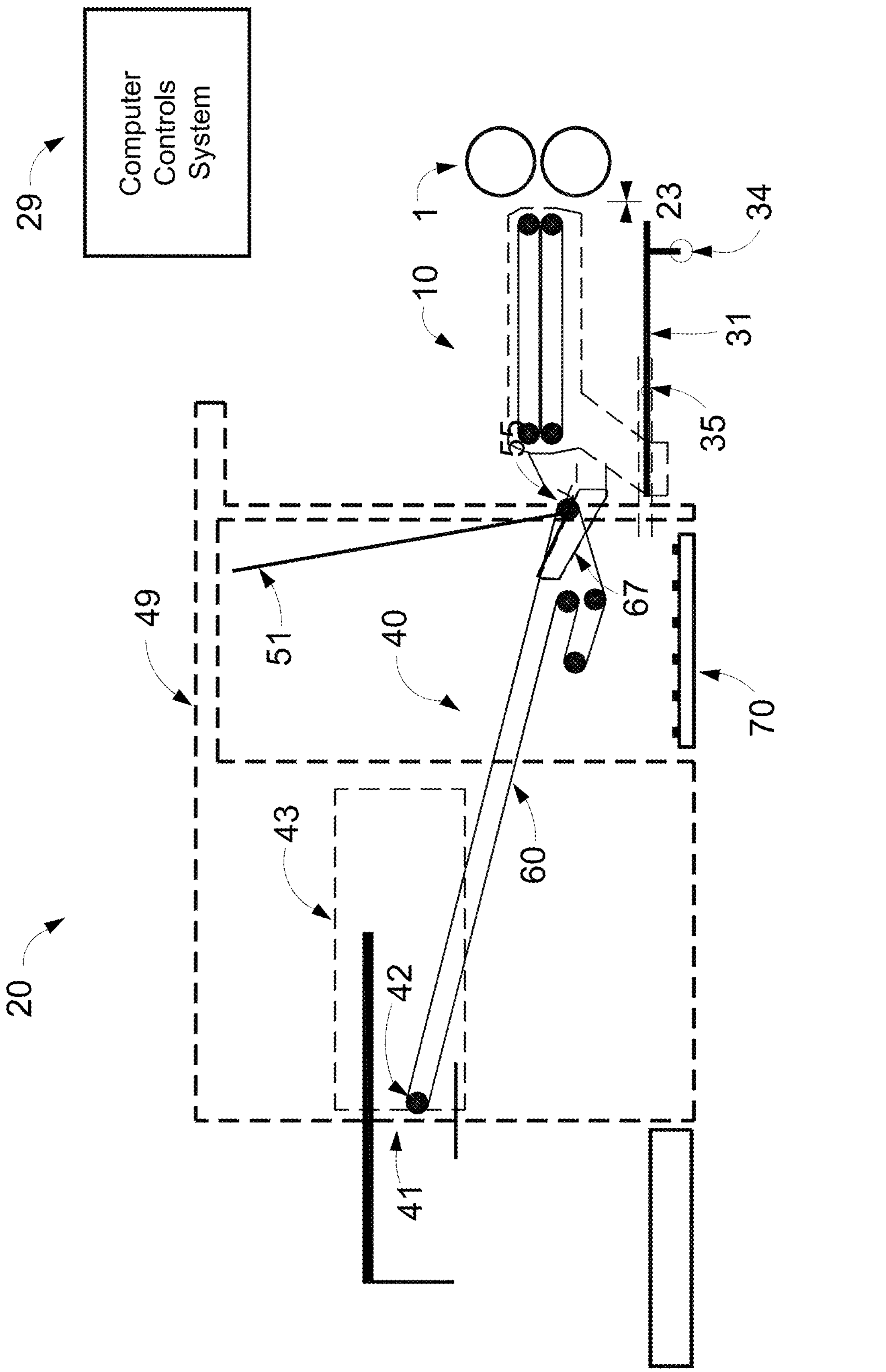
FIG. 20 depicts an alternate improved Stacking Apparatus, side view of kinematic overlay only, Normal Running State 20, Minimum Layboy Roll Out 23.
Figures 21A, 21B, 21C:
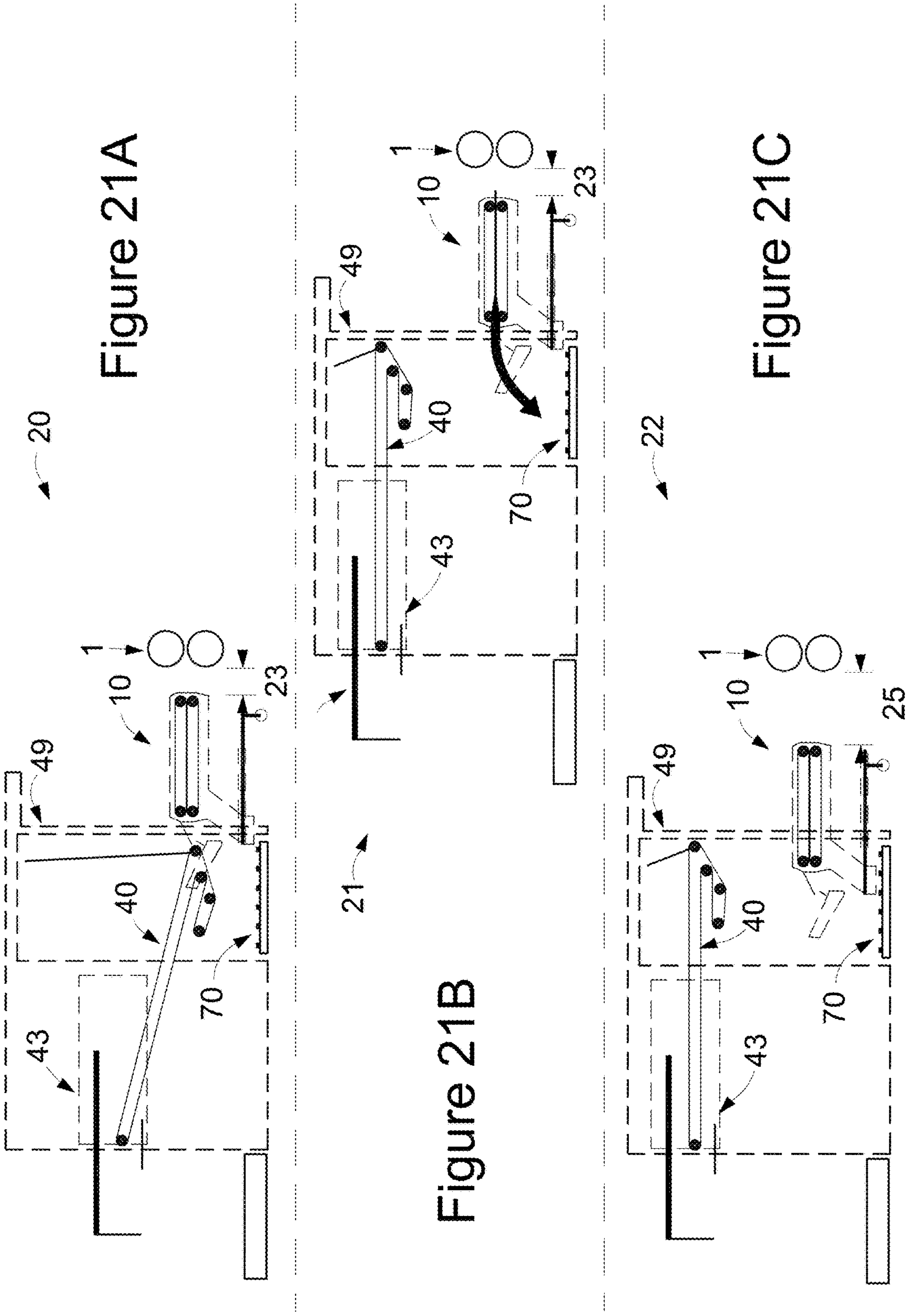
FIG. 21A-21C depicts an alternate improved Sheet Stacking Apparatus of FIG. 20, side view of kinematic overlay only, Normal Running State 20 with increased Running. Layboy Roll Out 23 (FIG. 21A), Sample Sheet State 21 (FIG. 21B) and Die Board Access State 22 (FIG. 21C).

In FIGS. 20 and 21, an alternate embodiment of the improved Stacking Apparatus is shown in kinematic overlay form. In this configuration, the Straight Belt Style Transfer Deck 11 has been eliminated and the Shingling Function 3 and Stacking Function 4 are performed by the Telescoping Stacking Deck 40. The same three states Normal Running State, Sample Sheet State and Die Board Access State are possible.

Figure 22:
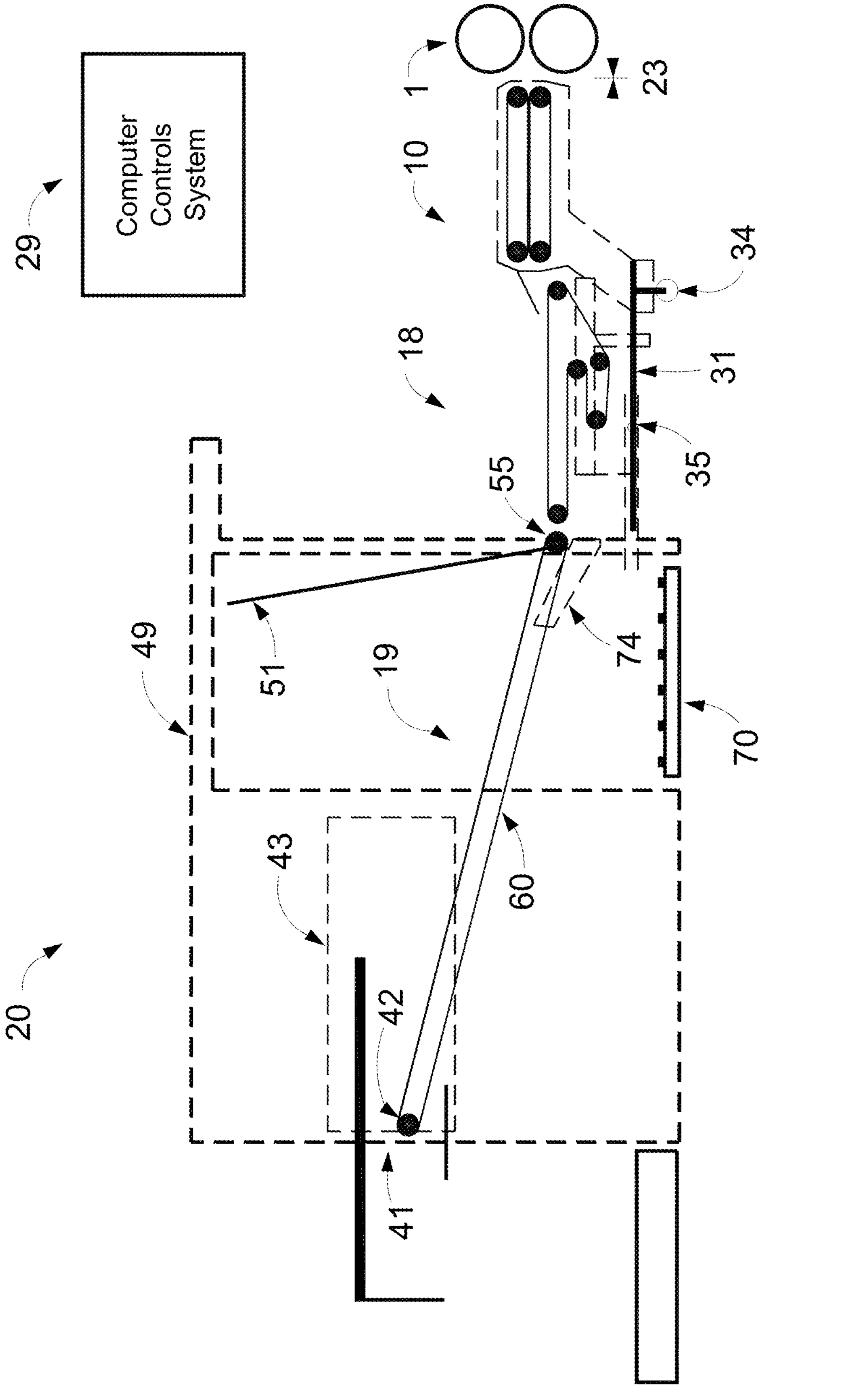
FIG. 22 depicts an alternate improved Sheet Stacking Apparatus, side view of kinematic overlay only, Normal Running State 20, Minimum Layboy Roll Out 23.
Figures 23A, 23B, 23C:
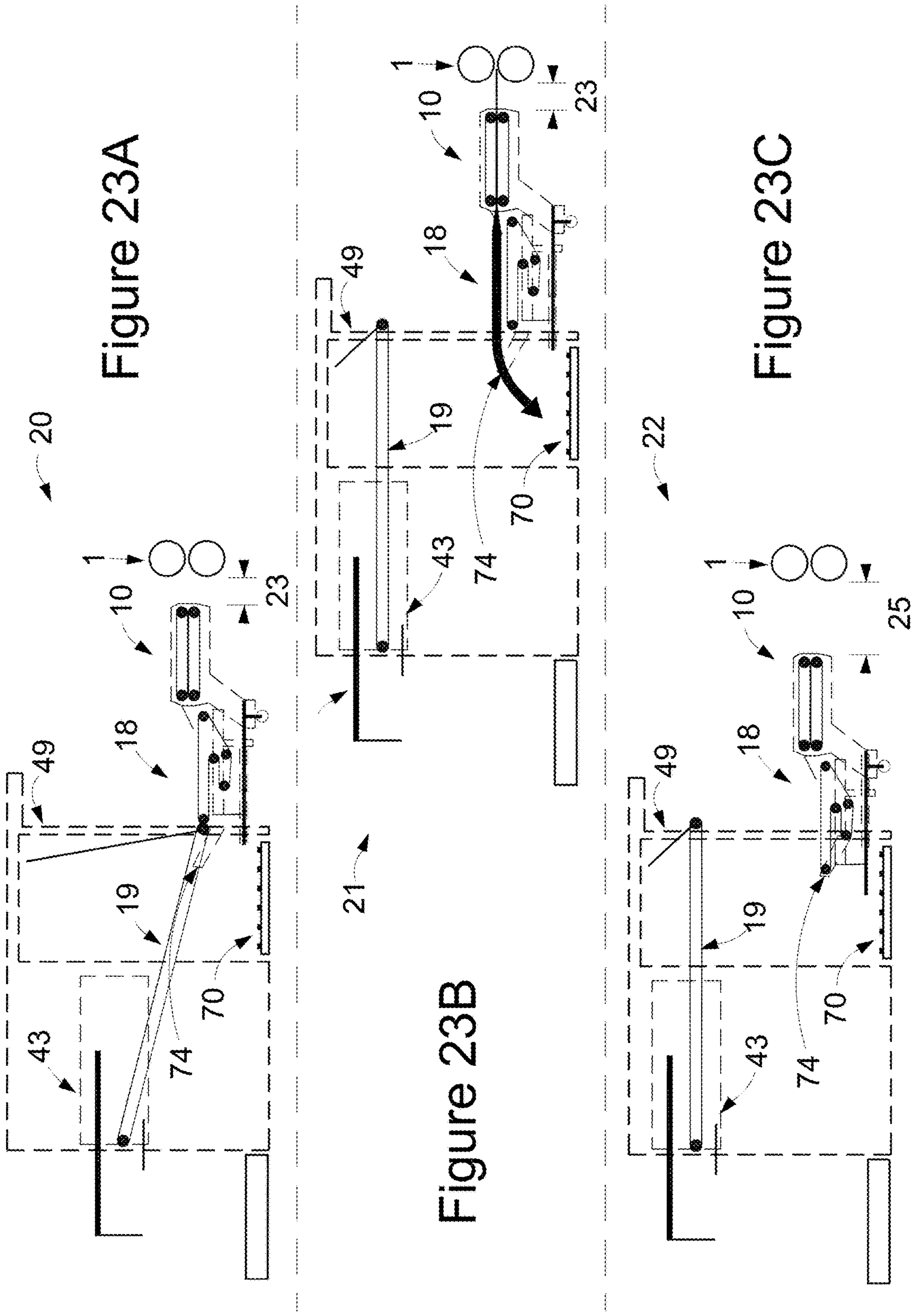
FIG. 23A-23C depicts an alternate improved Sheet Stacking Apparatus of FIG. 22, side view of kinematic overlay only, Normal Running State 20 with increased Running Layboy Roll Out 23 (FIG. 23A), Sample Sheet State 21 (FIG. 23B) and Die Board Access State 22 (FIG. 23C).

In FIGS. 22 and 23, an alternate embodiment of the improved Stacking Apparatus is shown in kinematic overlay form. In this configuration, the Straight Belt Style Transfer Deck 11 has been replaced with a Telescoping Straight Belt Style Transfer Deck 18 by using similar engineering design for the Telescoping Stacker Deck 40. The Telescoping Stacking Deck has now been replaced with a fixed length Stacking Deck 19. In this embodiment, the Gantry Mounted Ramps 74 and stops can be short and mounted to the Gantry. The same three states Normal Running State 20, Sample Sheet State 21 and Die Board Access State 22 are possible.

Figure 2:
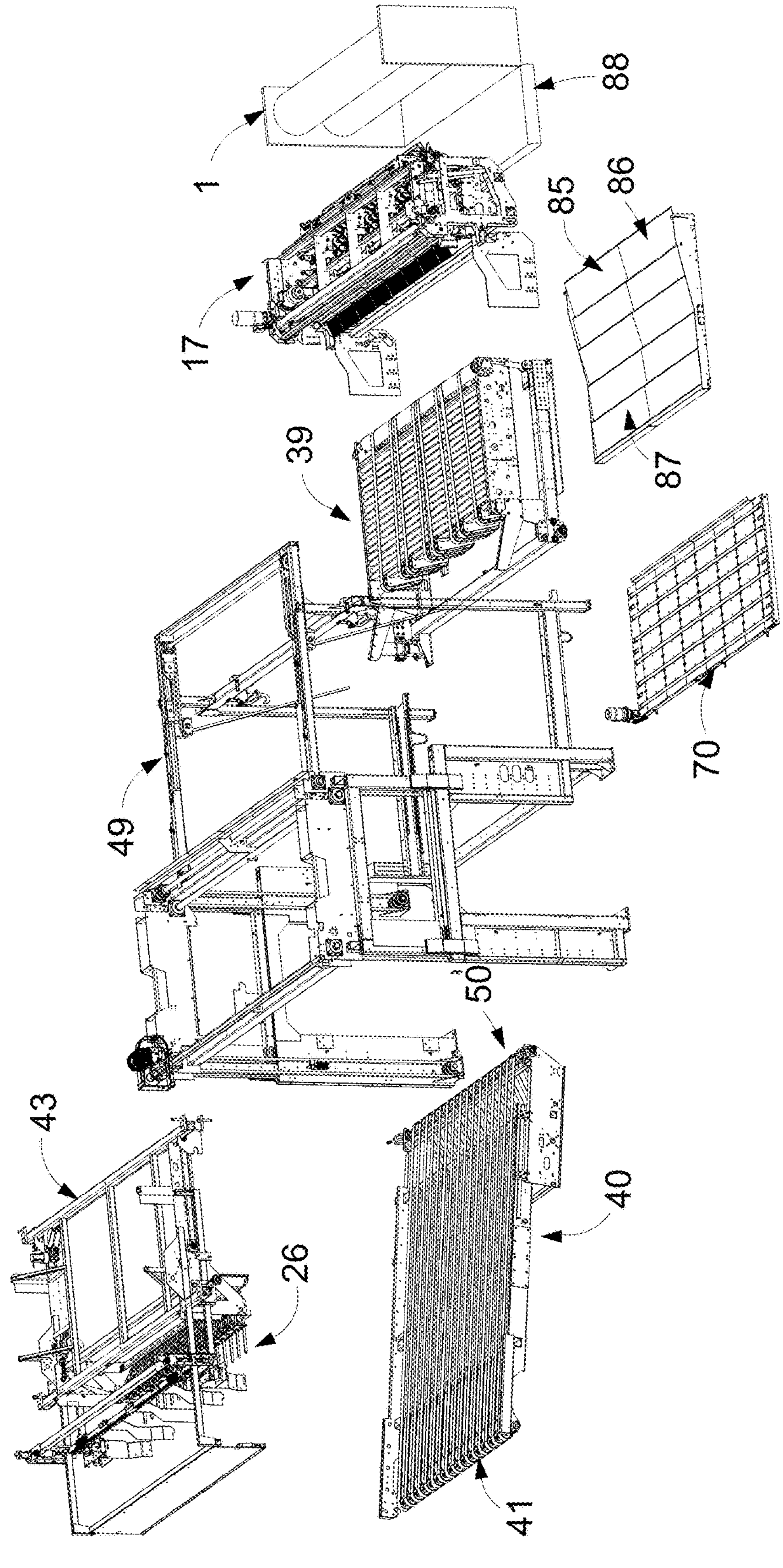
FIG. 2 depicts an improved Sheet Stacking Apparatus, exploded perspective view.

The improved Stacking Apparatus described herein is shown in FIG. 1 fully assembled and in FIG. 2 in an exploded view for better clarity has a Puffer Pan 85 positioned generally under Diverting Belt Style Transfer Deck 39 when the Diverting Belt Style Transfer Deck 39 in the in Normal Running State 20. The Puffer Pan 85 can be either attached to the moving machinery of the stacker or as in this case fixed to the ground. It is positioned so that the Puffer Pan Upstream End 86 can delivers Scrap 96 onto Cross Machine Scrap Conveyor 88 (which is under the layboy 17).

The location of the Puffer Pan 85 is in an area which is difficult for the operator to get easy access. However, unlike the Cross Machine Scrap Conveyor 88 which see a very substantial amount of Scrap 96, the amount of Scrap 96 that may get onto the Puffer Pan 85 is a small fraction of what is being produced by the Rotary Die Cutter 1. However, over time, the amount of Scrap 96 can build up in this area requiring house cleaning and if it is ignored too long could even require stopping the active order.

It has been learned through experimentation that the distance a piece of Scrap 96 can be blown by air relies heavily on both the way the Scrap 96 is laying on the surface and the velocity of the air hitting the Scrap 96. Typically, worse case is when the Scrap 96 is lying flat on a surface which leaves only the air velocity to move the Scrap 96 a certain distance. As the length of Diverting Belt Style Transfer Deck 39 is commonly approximately 72 inches, even if diverting ramps are employed, the Scrap 96 will need to be blown 36 inches or more from the Puffer Pan Downstream End 87 to the Puffer Pan Upstream End 86. When compressed air is released through a nozzle into the atmosphere the maximum air velocity is at the nozzle, known as Nozzle Air Velocity 90 and the lower air velocity impacting the Scrap 96 is known as the Scrap Air Velocity 91. The Scrap Air Velocity 91 is greatly reduced in a non-linear fashion with the distance it is located from the nozzle, the Nozzle-Scrap Distance 92. In order to blow a substantial area in the machine width direction requires a plurality of side by side Puffer Nozzles 92 which multiplies the air requirement by the number of Puffer Nozzles 92.

In FIGS. 24A-B, 25A-C and 26A-B, a Puffer Pan 85 is constructed using a plurality of Puffing Segments 89', 89", 89'". 89"" and 89""' (also referred to as pan segments) which can be overlapped in any arrangement but in this case a general ramp shape increasing in elevation from the Puffer Pan Downstream End 87 to the Puffer Pan Upstream End 86 (ie so scrap is blown up the ramp in a direction from the downstream end to the upstream end with respect to the rotary die cutter that is the source of the scrap). The pan segments 89'-89""' are positioned with their long dimension in the cross machine direction Each Puffing Segment 89'-89""' has a cross machine Puffer Tube 93', 93", 93", 93"" and 93""' (see also FIGS. 27-28) which is drilled with a plurality of holes to act as the Puffer Nozzles 92 (air nozzles). The Puffer Tube 93', 93", 93'", 93"" and 93""' are positioned in overlap regions between adjacent panel segments. The nozzles as positioned to blow scrap in an upstream directions toward the rotary die cutter. The pan segment 93""' nearest the rotary die cutter is positioned such that the scrap blown from this segment will land on Cross Machine Scrap Conveyor 88. The plurality of nozzles are grouped together such that multiple nozzles can be selectively activated but without needing to actuate all simultaneously. Air circuitry, discussed below, is operatively connected to computer controls means to accumulate air for a period of time and logically sequence the groups of nozzles to clear the multiple pan segments. In some embodiments, rather than using 5 tubes 93'-93""', one or more other types of air chambers can be used, where the one or more air chambers include a plurality of groups of nozzles, each panel segment 89'-89""' is associated with a group of nozzles configured to blow scrap across the panel segment to at least a next location, for a subset of panel segments the next location is an adjacent panel segment, for an end panel segment the next location is off the puffer pan. As discussed below, each group of nozzles can be separately activated without actuating all group of nozzles simultaneously.

Figure 24A:
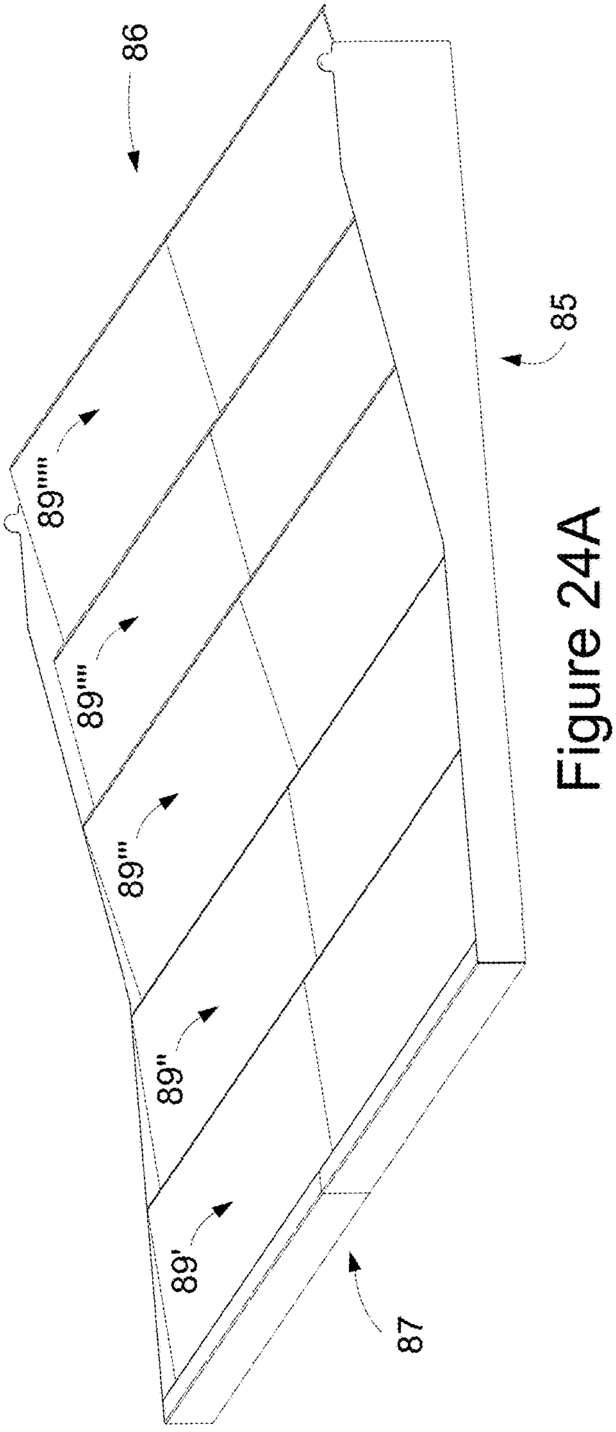
FIG. 24A depicts a Puffer Pan in perspective viewed from the Puffer Pan Downstream End 87.
Figure 24B:
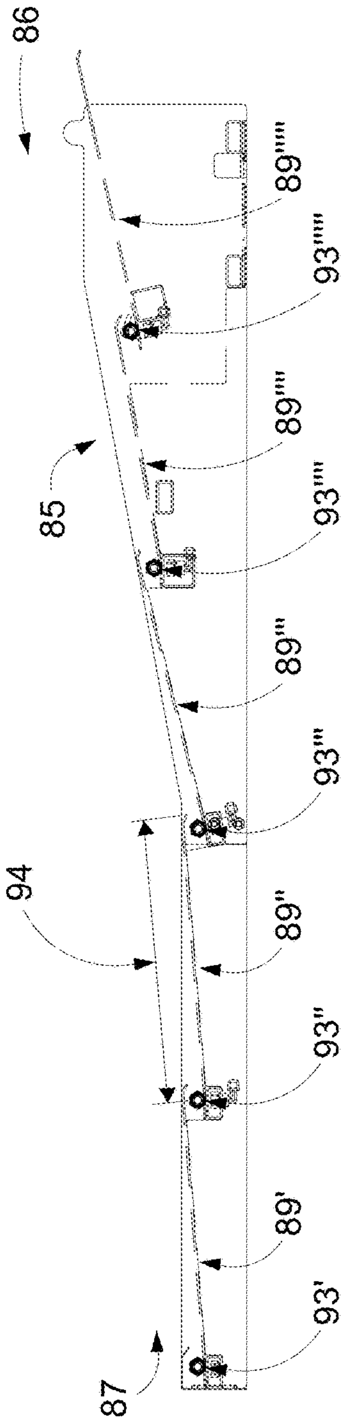
FIG. 24B is a Puffer Pan from a side view.
Figures 25A, 25B, 25C:
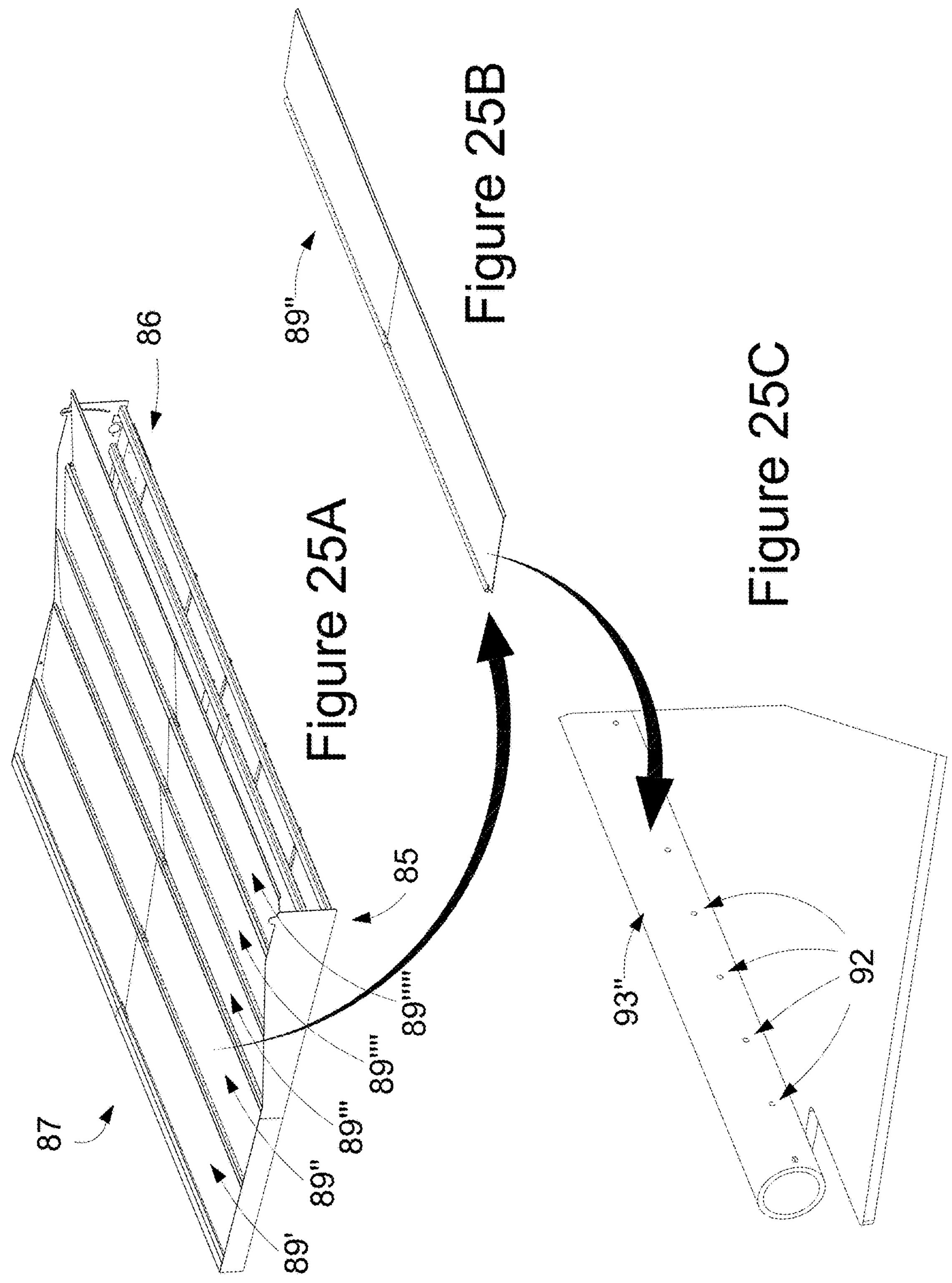
FIG. 25A depicts a Puffer Pan perspective viewed from the Puffer Pan Upstream End 86.
FIG. 25B-depicts additional details of FIG. 25A.
FIG. 25C depicts additional details of FIG. 25A.
Figure 26A:
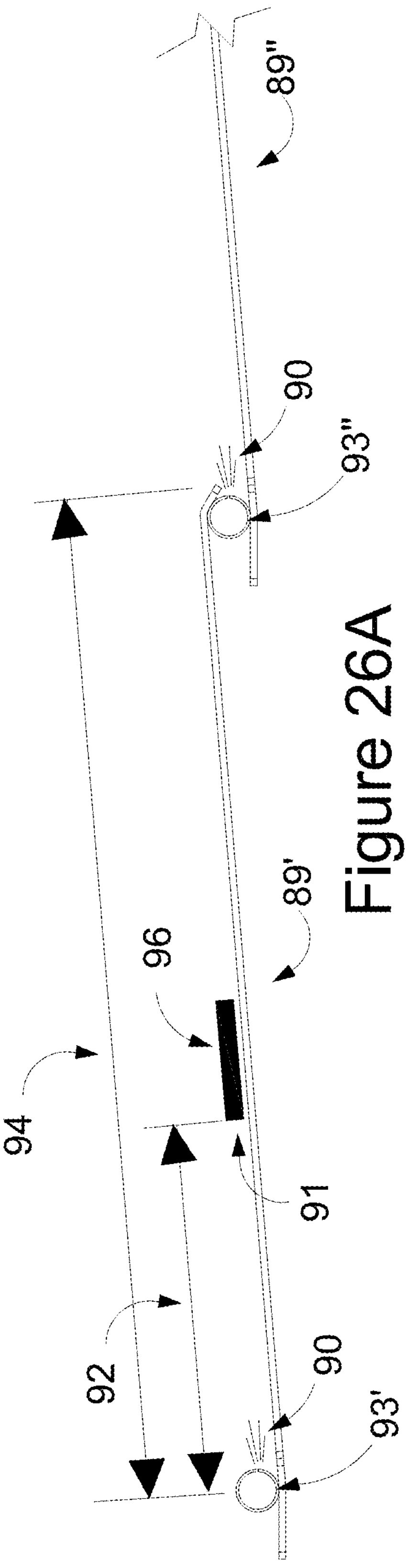
FIGS. 26A and B depicts side views of the Puffer Pan Segments 89 with the air action upon the Scrap 96.
Figure 26B:
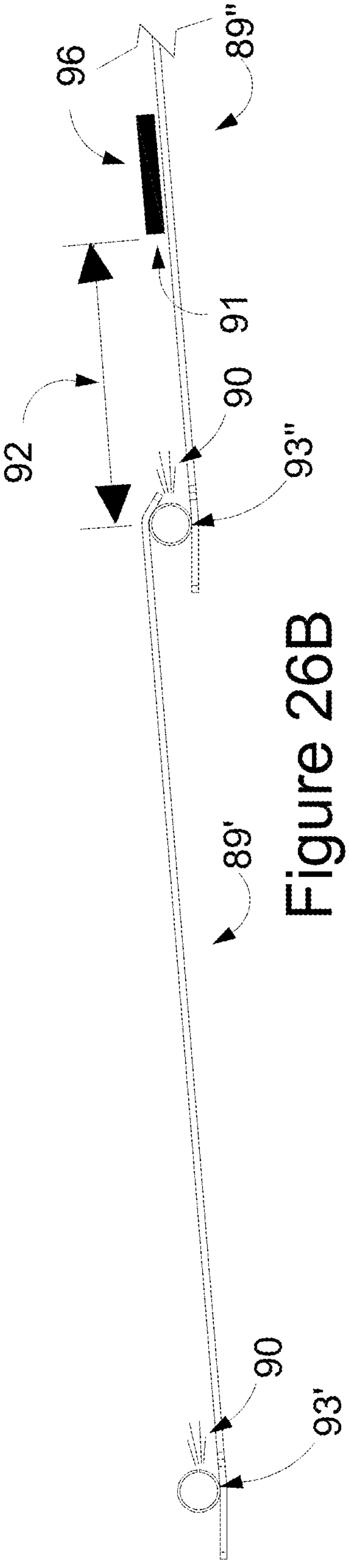

By arranging the Puffer Segments 89'-89""' in the overlapping arrangement allows the Scrap 96 to only need to be blown a shorter distance, Puffer Segment Length 94, resulting in the Scrap 96 on the next Puffer Segment 89'-89""' which again has a shorter Nozzle-Scrap Distance 92. Note that FIG. 24B shows that each of tubes 93'-93""' (and their associated nozzles) is at a downstream position for its associated panel segment 89'-89""'.

Even with this preferred arrangement, the Puffer Tubes 93'-93""' each have a substantial number of Puffer Nozzles 92 which when added together would require the box plant to dedicate a substantial amount of compressed air if all Puffer Tubes 93'-93""' were to be operated as the same time. Even sequential single tube constant operation of the Puffer Tubes 93'-93""' for each Puffer Segment 89'-89""' can be taxing on the box plant's compressed air system.

Figure 27:
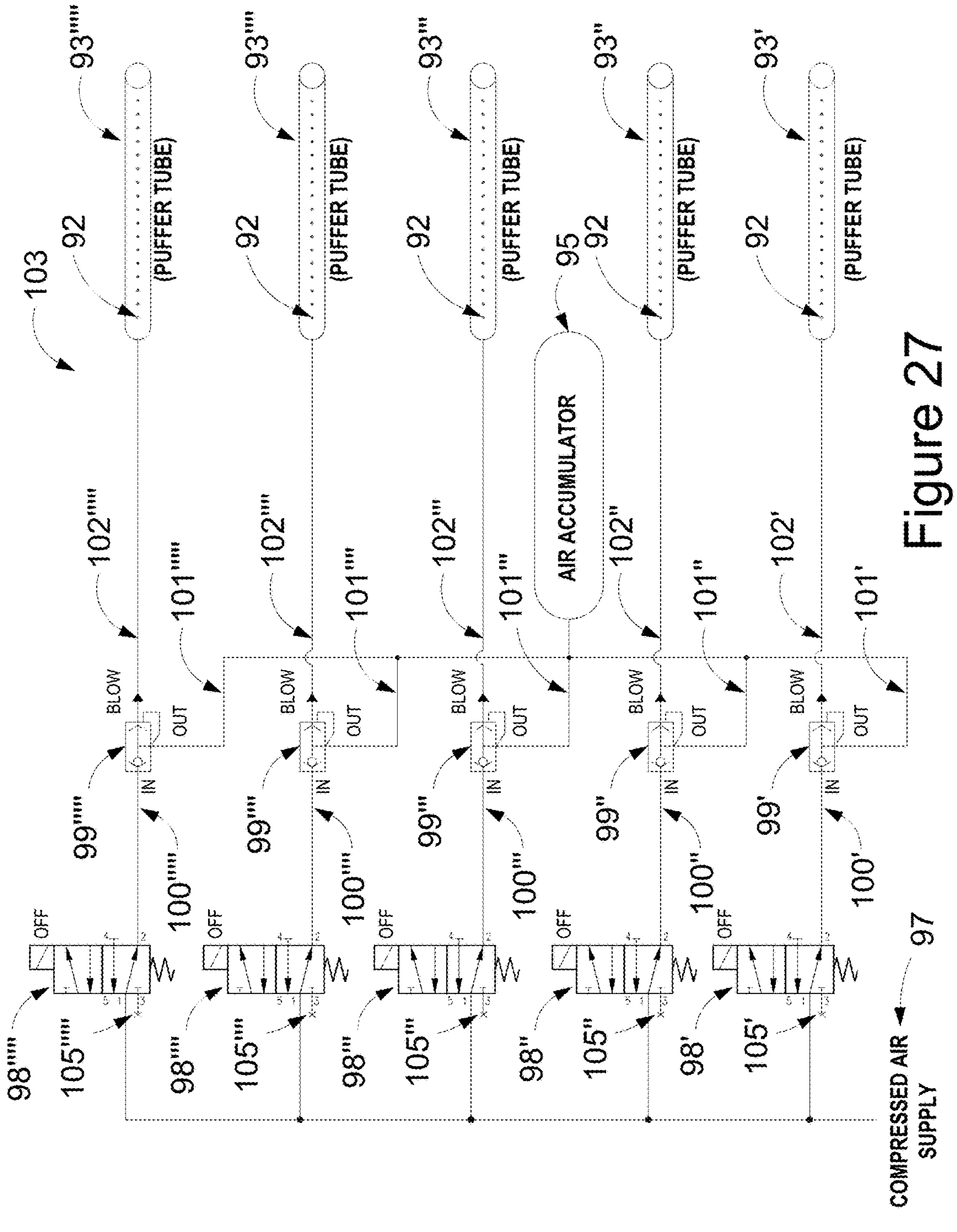
FIG. 27 depicts an air schematic as one means by which to create puffs of air for the Puffer Pan 85. The circuit is in the Charging Accumulator Mode 103.

In FIG. 27 is an air circuit which allows air to be locally built up in an Air Accumulator 95 over a period of time and then selectively discharged through one or more Puffer Tubes 93. The current state of FIG. 27 is the Charging Accumulator Mode 103. A Compressed Air Supply 97 feeds a plurality of Puffer Control Valves 98', 98", 98'", 98"" and 98""', with one control valve for each panel segment. The normally open output from these valves each tie to an associated Quick Exhaust Valves 99', 99", 99'", 99"" and 99""'. The Puffer Control Valves 98'-98""' each have Atmosphere Ports 105', 105", 105'", 105"" and 105""' for when the valve changes state. The function of a Quick Exhaust Valve 99'-99""' is to pass air from its Input 100'-101""' to its Output 101'-101""' while the air pressure is equal or greater at the Input than the Output. As a result in the Charging Accumulator Mode, all the Puffer Control Valves 98' through 98""' are off and the air flows from the Compressed Air Supply 97 into the Air Accumulator 95. Once the pressures equalize, no more air flows. The additional function of a Quick Exhaust Valve 99'-99""' is that once air pressure is removed from the Input 100', 100", 100'". 100"" and 100""' air is allowed to exhaust through a large orifice within the valve to the Blow ports 102', 102", 102'", 102"" and 102""'. Adequate size piping between the Air Accumulator 95, the Quick Exhaust Valves 99'-99""' and the Puffer Tubes 93'-93""' is required to allow most of the air from the Air Accumulator 95 to very quickly discharge into the selected Puffer Tube 93'-93""'.

Figure 28:
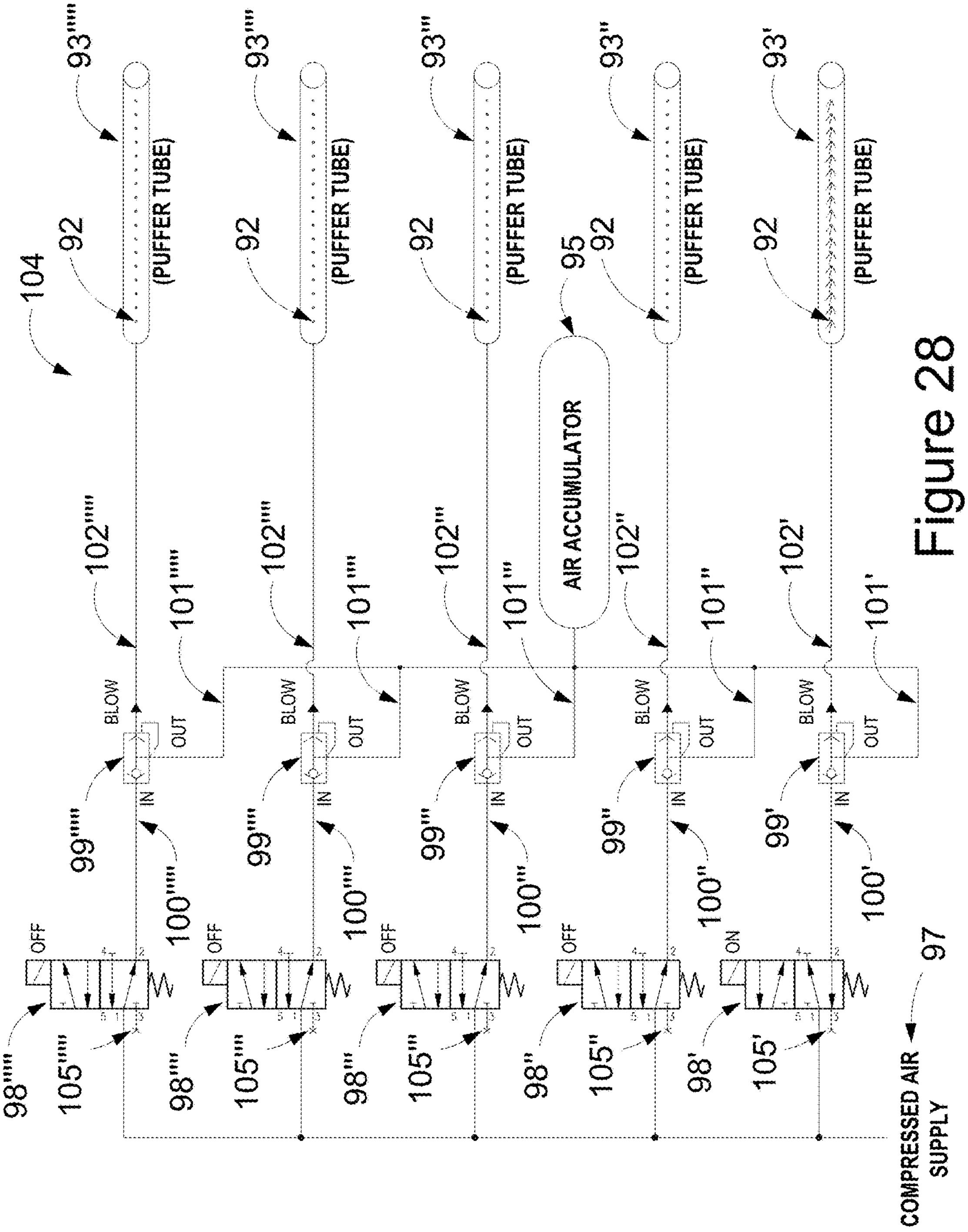
FIG. 28 depicts an air schematic as one means by which to create puffs of air for the Puffer Pan 85. The circuit is in the Discharge Accumulator Mode 104.

In FIG. 28, the same circuit of FIG. 27 is now in Discharge Accumulator Mode 104. The Computer Control System 29 is operatively connected to Puffer Control Valves 98', 98'', 98''', 98'''' and 98'''''. In this figure, only Puffer Control Valve 98' has been turned on. A small amount of air is quickly released out Atmosphere Port 105'. The Quick Exhaust Valve 99' now discharges most of the air from the Air Accumulator 95 into Puffer Tube 93'. This rapid discharge creates substantial Nozzle Air Velocity 90 at all the Puffer Nozzles 92.

Based on the logic in the Computer Control System 29, the air in the Air Accumulator 95 is quickly released into each Puffer Tubes 93'-93''''' sequential creating a puff of air on the selected Puffer Segment 89'-89'''''. While the order is not critical, typically the Computer Control System 29 will start at the Puffer Segment 89' nearest the Puffer Pan Downstream End 87, puff the Puffer Segment 89', wait a period of time to at least recharge the Air Accumulator 95, then puff the next Puffer Segment 89'' until all segments are completed up to the Puffer Pan Upstream End 86. At this point the Scrap 96 is deposited on the Cross Machine Scrap Conveyor 88.

As the amount of Scrap 96 can vary, the Computer Control System 29 should allow the operator to further reduce the amount of time between puffs even further and also should not run unless the machine is producing boxes. Both of these measures allow the Box Maker to minimize the systems impact on their air system.

One embodiment includes a sheet stacking apparatus, comprising: a first set of one or more conveyors including a layboy configured to receive boxes from a rotary die cutter; a hopper configured to support a stack of boxes; and a stacking conveyor configured to move boxes from the first set of one or more conveyors to the hopper. The stacking conveyor includes an input side and an output side. The input side is configured to be moved vertically between a low position where the stacking conveyor receives boxes from the first set of one or more conveyors and a high position that allows at least a portion of the first set of one or more conveyors to be positioned underneath the stacking conveyor. The first set of one or more conveyors is configured to be movable without moving the hopper such that at least a portion of the first set of one or more conveyors can be moved underneath the stacking conveyor when the stacking conveyor is in the high position to allow access to the rotary die cutter.

In one example, the stacking conveyor is telescoping such that the stacking conveyor is a first length in the low position and a second length in the high position and/or the stacking conveyor is telescoping such that the stacking conveyor has a long length in the low position and a short length in the low position.

One embodiment includes a sheet stacking apparatus, comprising: a first set of one or more conveyors configured to receive boxes from a rotary die cutter; a hopper configured to support a stack of boxes; a stacking conveyor configured to move boxes from the first set of one or more conveyors to the hopper; and a sample sheet conveyor. The stacking conveyor includes an input side and an output side. The input side is configured to be moved vertically from a low position where the stacking conveyor receives boxes from the first set of one or more conveyors and a high position. The sample sheet conveyor includes an input end configured to receive boxes from the first set of one or more conveyors when the stacking conveyor is in the high position. The input end is blocked from receiving boxes from the first set of one or more conveyors when the stacking conveyor is in the low position.

One embodiment includes a sheet stacking apparatus, comprising: a first set of one or more conveyors configured to receive boxes from a rotary die cutter, a gap exists between the first set of one or more conveyors and the rotary die cutter; a hopper configured to support a stack of boxes; and a telescoping stacking conveyor configured to move boxes from the first set of one or more conveyors to the hopper. To adjust a size of the gap between the first set of one or more conveyors and the rotary die cutter while passing boxes between the first set of one or more conveyors and the rotary die cutter the first set of one or more conveyors are configured to be moved away from the rotary die cutter without moving the hopper when the stacking conveyor is shortened in length.

One embodiment includes a method of operating a sheet stacking apparatus, comprising: transporting boxes from a rotary die cutter to a fixed location hopper via a first set of one or more conveyors and a stacking conveyor; and providing access to the rotary die cutter by raising the stacking conveyor and moving the first set of one or more conveyors such that at least a portion of the first set of one or more conveyors is beneath the raised stacking conveyor.

One embodiment includes a sheet stacking apparatus, comprising: a first set of one or more conveyors including a layboy configured to receive boxes from a rotary die cutter; a hopper configured to support a stack of boxes; and a stacking conveyor configured to move boxes from the first set of one or more conveyors to the hopper. The stacking conveyor includes an input side and an output side. The input side and the output side are both configured to be moved vertically. The first set of one or more conveyors first configured to be movable with respect to the hopper to allow access to the rotary die cutter such that at least a portion of the first set of one or more conveyors can be moved underneath the stacking conveyor when at least one of the input end and the output end are raised vertically.

One embodiment includes a puffer pan, comprising: a plurality of pan segments; and one or more air chambers that include a plurality of groups of nozzles, each panel segment is associated with a group of nozzles configured to blow scrap across the panel segment to at least a next location, for a subset of panel segments the next location is an adjacent panel segment, for an end panel segment the next location is off the puffer pan.

One example implementation further comprises: a computer; and an air circuit operatively connected to the computer and the groups of air nozzles. The air circuitry accumulates air for a period of time and logically sequences air to the groups of nozzles to clear the multiple pan segments.

One embodiment includes a puffer pan, comprising: a ramp that increases in elevation from a downstream end to an upstream end; and one or more air chambers that include a plurality nozzles configured to blow scrap up the ramp in a direction from the downstream end to the upstream end.

One embodiment includes a puffer pan, comprising: a plurality of adjacent pan segments forming a ramp; and means for blowing scrap across the pan segments using multiple puffs of air separately provided at different times from sources between multiple pan segments.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more others parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

For purposes of this document, the term "based on" may be read as "based at least in part on."

For purposes of this document, without additional context, use of numerical terms such as a "first" object, a "second" object, and a "third" object may not imply an ordering of objects, but may instead be used for identification purposes to identify different objects.

For purposes of this document, the term "set" of objects may refer to a "set" of one or more of the objects.

The foregoing detailed description has been presented for purposes of illustration and description. It is not intended to be exhaustive or to limit the technology described herein to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated.

What is claimed is:

1. A puffer pan, comprising:

a plurality of pan segments; and one or more air chambers that include a plurality of tubes with nozzles, the plurality of pan segments is in one-to-one correspondence with the plurality of tubes such that each pan segment has a corresponding tube that is configured to blow scrap across the pan segment to at least a next location, for a subset of pan segments the next location is an adjacent pan segment, for an end pan segment the next location is off the puffer pan.

2. The puffer pan of claim 1, wherein:

each tube is at a downstream position for its corresponding pan segment.

3. The puffer pan of claim 1, wherein:

the pan segments are positioned with their long dimension in a cross machine direction with respect to a rotary die cutter that is the source of the scrap; and the nozzles as positioned to blow scrap in an upstream directions with respect to the rotary die cutter.

4. The puffer pan of claim 1, wherein:

for the end pan segment the next location is on a cross machine scrap conveyor positioned between the end pan segment and the rotary die cutter.

5. The puffer pan of claim 1, wherein:

each group of nozzles can be separately activated without actuating all group of nozzles simultaneously.

6. The puffer pan of claim 1, further comprising:

a computer; and an air circuit operatively connected to the computer and the nozzles, the air circuitry accumulates air for a period of time and logically sequences air to the nozzles to clear the multiple pan segments.

7. The puffer pan of claim 1, further comprising:

an air accumulator; and an air circuit which allows air to be built up in the air accumulator over a period of time and then selectively discharges the built up air from the air accumulator through one of the tubes.

8. The puffer pan of claim 1, further comprising:

an air supply;

a plurality of control valves connected to the air supply, with one control valve for each pan segment;

a plurality of quick exhaust valves connected to the control valves, the quick exhaust valves each have an input and an output as well as a blow port, the quick exhaust valves pass air from their input to their output while air pressure is equal or greater at the respective input than the respective output, once air pressure is removed from the respective input the quick exhaust valves allow air to exhaust through the respective blow port, each tube is connected to one of the blow ports; and an air accumulator connected to the quick exhaust valves, the control valves are configured to selectively allow air to escape causing a connected quick exhaust valve to allow air from the air accumulator to be provided to one of the tubes.

9. The puffer pan of claim 1, wherein:

adjacent pan segments of the plurality of pan segments are overlapping.

10. The puffer pan of claim 1, wherein:

adjacent pan segments of the plurality of pan segments are overlapping at overlap regions; and each overlap region includes one of the tubes.

11. The puffer pan of claim 1, wherein:

the plurality of pan segments are arranged in a ramp shape that increases in elevation from a downstream end of the plurality of pan segments to an upstream end of the plurality of pan segments with respect to a rotary die cutter that is the source of the scrap.

12. The puffer pan of claim 1, further comprising:

a sheet stacking apparatus, the puffer pan is attached to moving machinery of the sheet stacking apparatus.

13. The puffer pan of claim 1, wherein:

a sheet stacking apparatus, the puffer pan is attached to ground underneath the sheet stacking apparatus.

* * * * *